US012775090B2

(12) United States Patent
Hong et al.

(10) Patent No.: US 12,775,090 B2
(45) Date of Patent: Oct. 27, 2026

(54) ELECTRONIC APPARATUS AND CONTROL METHOD THEREOF

(71) Applicant: SAMSUNG ELECTRONICS CO., LTD., Suwon-si (KR)

(72) Inventors: Hyunseok Hong, Suwon-si (KR); Jinpyo Gwak, Suwon-si (KR); Junghoe Kim, Suwon-si (KR); Daehwan Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1215 days.

(21) Appl. No.: 17/566,210

(22) Filed: Dec. 30, 2021

(65) Prior Publication Data

US 2022/0120902 A1 Apr. 21, 2022

Related U.S. Application Data

(63) Continuation of application No. PCT/KR2021/013845, filed on Oct. 8, 2021.

(30) Foreign Application Priority Data

Oct. 8, 2020 (KR) ........................ 10-2020-0130583
Dec. 24, 2020 (KR) ........................ 10-2020-0183724
Jul. 28, 2021 (KR) ........................ 10-2021-0099483

(51) Int. Cl.
*G01S 17/32* (2020.01)
*G01S 17/89* (2020.01)
(Continued)

(52) U.S. Cl.
CPC .............. *G01S 17/32* (2013.01); *G01S 17/89* (2013.01); *G06V 10/141* (2022.01); *G06V 10/25* (2022.01)

(58) Field of Classification Search
CPC ...... G01S 17/10; G01S 17/894; G01S 7/4915; G01S 7/4918; G01S 17/32; G01S 17/89
See application file for complete search history.

(56) References Cited

U.S. PATENT DOCUMENTS 8,306,323 B2 11/2012 Sim
9,453,743 B2 9/2016 Lee et al.
(Continued)

FOREIGN PATENT DOCUMENTS

CN 108027238 A 5/2018
EP 3 346 288 A1 7/2018
(Continued)

OTHER PUBLICATIONS

International Search Report (PCT/ISA/210) and Written Opinion (PCT/ISA/237) dated Jan. 28, 2022 issued by the International Searching Authority in International Application No. PCT/KR2021/013845.
(Continued)

*Primary Examiner* — Yuqing Xiao
(74) *Attorney, Agent, or Firm* — Sughrue Mion, PLLC

(57) ABSTRACT

An electronic apparatus and a control method thereof are provided. The electronic apparatus includes a sensor; and a processor configured to obtain, from the sensor, first information related to a distance to an object and second information related to reliability of the first information, identify at least one cell not including distance information, among a plurality of cells corresponding to a plurality of pixels constituting the sensor, based on the first information, determine a reliability of the at least one cell based on the second information, change a parameter setting of the sensor based on the determined reliability, obtain, from the sensor of which the parameter setting is changed, third information related to the distance to the object, obtain fourth information including the distance information of the plurality of
(Continued)

cells based on the first information and the third information, and obtain the distance to the object based on the distance information included in the fourth information.

20 Claims, 23 Drawing Sheets

(51) Int. Cl.
*G06V 10/141* (2022.01)
*G06V 10/25* (2022.01)

(56) References Cited

U.S. PATENT DOCUMENTS

| | | | |
|---|---|---|---|
| 9,819,879 | B2 | 11/2017 | Kim et al. |
| 9,995,576 | B2 | 6/2018 | Lee et al. |
| 10,462,446 | B2 | 10/2019 | Varekamp et al. |
| 10,516,873 | B2 | 12/2019 | Wei et al. |
| 10,571,571 | B2 | 2/2020 | Ko et al. |
| 10,599,930 | B2 | 3/2020 | Lee et al. |
| 10,719,699 | B2 | 7/2020 | Singh et al. |
| 10,782,399 | B2 | 9/2020 | Lee et al. |
| 10,866,321 | B2 | 12/2020 | Yamada |
| 2013/0016900 | A1 | 1/2013 | Kim et al. |
| 2015/0168541 | A1 | 6/2015 | Lee et al. |
| 2016/0123764 | A1 | 5/2016 | Lee et al. |
| 2016/0182789 | A1 | 6/2016 | Wan et al. |
| 2017/0324909 | A1 | 11/2017 | Choi et al. |
| 2018/0048829 | A1 | 2/2018 | Chan |
| 2018/0107871 | A1 | 4/2018 | Singh et al. |
| 2019/0042860 | A1 | 2/2019 | Lee et al. |
| 2019/0113606 | A1 | 4/2019 | Mathy et al. |
| 2019/0260914 | A1 | 8/2019 | Kim et al. |
| 2019/0317213 | A1 | 10/2019 | Kubota et al. |
| 2020/0151894 | A1 | 5/2020 | Jain et al. |
| 2020/0158876 | A1* | 5/2020 | Karadeniz ............. G01S 7/4808 |
| 2020/0267322 | A1* | 8/2020 | Wei ...................... H04N 23/672 |
| 2021/0096225 | A1* | 4/2021 | Subasingha ............. G01S 17/10 |
| 2021/0141090 | A1* | 5/2021 | Nakamura ............ G01S 7/4868 |
| 2022/0206155 | A1* | 6/2022 | Inada .................... G01S 17/894 |

FOREIGN PATENT DOCUMENTS

| | | | | | |
|---|---|---|---|---|---|
| JP | 2001 154083 | A | | 6/2001 | |
| JP | 5546419 | B2 | * | 7/2014 | |
| JP | 2017-216631 | A | | 12/2017 | |
| KR | 10-0926287 | B1 | | 11/2009 | |
| KR | 1020130008434 | A | | 1/2013 | |
| KR | 10-1497659 | B1 | | 3/2015 | |
| KR | 1020150080690 | A | | 7/2015 | |
| KR | 1020160054156 | A | | 5/2016 | |
| KR | 10 1784611 | B1 | | 11/2017 | |
| KR | 10-1828802 | B1 | | 2/2018 | |
| KR | 1020180096980 | A | | 8/2018 | |
| KR | 1020190014908 | A | | 2/2019 | |
| KR | 10-1967305 | B1 | | 5/2019 | |
| WO | WO-2020021914 | A1 | * | 1/2020 | ............. G03B 15/05 |

OTHER PUBLICATIONS

Communication dated Nov. 20, 2023, issued by the European Patent Office in European Application No. 21878042.7.
Communication dated Aug. 8, 2025 issued by the European Patent Office in European Patent Application No. 21878042.7.
Communication dated Sep. 17, 2025 issued by the China National Intellectual Property Administration in Chinese Patent Application No. 202180066632.6.
Office Action issued on Apr. 7, 2026 by the National Intellectual Property Administration of P.R. China in Chinese Patent Application No. 202180066632.6.
Office Action issued May 7, 2026 by the Korean Ministry of Intellectual Property in Korean Patent Application No. 10-2021-0099483.
Communication dated Jul. 27, 2026 issued by the China National Intellectual Property Administration in Chinese Patent Application No. 202180066632.6.

* cited by examiner

FIG. 4A

| RELIABILITY VALUE | NUMBER OF CELLS |
|---|---|
| 0~25 | 25 |
| 26~50 | 43 |
| 51~75 | 30 |
| 76~100 | 15 |
| 101~125 | 23 |
| 126~150 | 13 |
| 151~175 | 5 |
| 176~200 | 8 |
| 201~225 | 7 |
| 226~255 | 47 |

➡ INCREASE IN LUMINOUS INTENSITY OF LIGHT EMITTER BY A1 TIMES INCREASE IN EXPOSURE TIME TO LIGHT BY B1 TIMES, OR INCREASE IN LUMINOUS INTENSITY OF LIGHT EMITTER BY A11 TIMES AND INCREASE IN EXPOSURE TIME TO LIGHT BY B11 TIMES

FIG. 4B

| RELIABILITY VALUE | NUMBER OF CELLS |
|---|---|
| 0~25 | 14 |
| 26~50 | 32 |
| 51~75 | 82 |
| 76~100 | 31 |
| 101~125 | 19 |
| 126~150 | 15 |
| 151~175 | 2 |
| 176~200 | 3 |
| 201~225 | 1 |
| 226~255 | 17 |

➡ INCREASE IN LUMINOUS INTENSITY OF LIGHT EMITTER BY A2 TIMES INCREASE IN EXPOSURE TIME TO LIGHT BY B2 TIMES, OR INCREASE IN LUMINOUS INTENSITY OF LIGHT EMITTER BY A22 TIMES AND INCREASE IN EXPOSURE TIME TO LIGHT BY B22 TIMES

FIG. 4C

| NUMBER OF CELLS LESS THAN OR EQUAL TO MINIMUM THRESHOLD VALUE | PARAMETER SETTING INFORMATION |
|---|---|
| 51 OR MORE | INCREASE IN LUMINOUS INTENSITY OF LIGHT EMITTER BY A1 TIMES INCREASE IN EXPOSURE TIME TO LIGHT BY B1 TIMES, OR INCREASE IN LUMINOUS INTENSITY OF LIGHT EMITTER BY A11 TIMES AND INCREASE IN EXPOSURE TIME TO LIGHT BY B11 TIMES |
| 31~50 | INCREASE IN LUMINOUS INTENSITY OF LIGHT EMITTER BY A2 TIMES INCREASE IN EXPOSURE TIME TO LIGHT BY B2 TIMES, OR INCREASE IN LUMINOUS INTENSITY OF LIGHT EMITTER BY A22 TIMES AND INCREASE IN EXPOSURE TIME TO LIGHT BY B22 TIMES |
| 11~30 | INCREASE IN LUMINOUS INTENSITY OF LIGHT EMITTER BY A3 TIMES INCREASE IN EXPOSURE TIME TO LIGHT BY B3 TIMES, OR INCREASE IN LUMINOUS INTENSITY OF LIGHT EMITTER BY A33 TIMES AND INCREASE IN EXPOSURE TIME TO LIGHT BY B33 TIMES |
| 0~10 | MAINTAIN |

FIG. 7B

| OPERATION VALUE | PARAMETER SETTING INFORMATION |
|---|---|
| THIRD VALUE OR MORE | INCREASE IN LUMINOUS INTENSITY OF LIGHT EMITTER BY X3 TIMES INCREASE IN EXPOSURE TIME TO LIGHT BY Y3 TIMES, OR INCREASE IN LUMINOUS INTENSITY OF LIGHT EMITTER BY X33 TIMES AND INCREASE IN EXPOSURE TIME TO LIGHT BY Y33 TIMES |
| SECOND VALUE TO THIRD VALUE | INCREASE IN LUMINOUS INTENSITY OF LIGHT EMITTER BY X2 TIMES INCREASE IN EXPOSURE TIME TO LIGHT BY Y2 TIMES, OR INCREASE IN LUMINOUS INTENSITY OF LIGHT EMITTER BY X22 TIMES AND INCREASE IN EXPOSURE TIME TO LIGHT BY Y22 TIMES |
| FIRST VALUE TO SECOND VALUE | INCREASE IN LUMINOUS INTENSITY OF LIGHT EMITTER BY X1 TIMES INCREASE IN EXPOSURE TIME TO LIGHT BY Y1 TIMES, OR INCREASE IN LUMINOUS INTENSITY OF LIGHT EMITTER BY X11 TIMES AND INCREASE IN EXPOSURE TIME TO LIGHT BY Y11 TIMES |
| 0 TO FIRST VALUE | MAINTAIN |

ELECTRONIC APPARATUS AND CONTROL METHOD THEREOF

CROSS-REFERENCE TO RELATED APPLICATIONS

This application is a bypass continuation of International Application No. PCT/KR2021/013845, filed on Oct. 8, 2021, which is based on and claims priority to Korean Patent Application No. 10-2021-0099483, filed on Jul. 28, 2021, Korean Patent Application No. 10-2020-0183724, filed on Dec. 24, 2020, and Korean Patent Application No. 10-2020-0130583, filed on Oct. 8, 2020, in the Korean Intellectual Property Office, the disclosures of which are incorporated by reference herein in their entireties.

BACKGROUND

1. Field

This disclosure relates to an electronic apparatus and a method for controlling thereof. More particularly, the disclosure relates to an electronic apparatus capable of sensing a distance to an object and a method for controlling thereof.

2. Description of Related Art

Recently, there has been developed an electronic apparatuses, such as an automated driving vehicle that performs driving on behalf of a human, an automated guided vehicle that classifies goods by itself and carries the goods to a destination, and a robot cleaner that performs cleaning while driving a space within a house.

To prevent collision with an object during driving, this kind of mobile electronic apparatus needs to sense objects located around the electronic apparatus or distance to the objects. For this purpose, particularly, an electronic apparatus having a light source-based sensor (e.g., an image sensor or a light detection and ranging (LiDAR) sensor or the like) has been developed.

However, a related-art electronic apparatus equipped with a light source-based sensor has a problem in that when the amount of light reflected by an object is insufficient, the distance to an object may not be detected. This applies a constraint to the driving of the electronic apparatus and, in particular, and may cause a collision between the electronic apparatus and the object.

SUMMARY

The disclosure relates to an electronic apparatus and a control method thereof, which are designed to address the above-mentioned problem, and it is an object of the disclosure to provide an electronic apparatus capable of receiving light having a minimum threshold value or more required for measuring a distance through a parameter setting change of a sensor and a control method thereof.

According to an aspect of the disclosure, an electronic apparatus may include: a sensor; and a processor configured to obtain, from the sensor, first information related to a distance to an object and second information related to reliability of the first information, identify at least one cell not including distance information, among a plurality of cells corresponding to a plurality of pixels constituting the sensor, based on the first information, determine a reliability of the at least one cell based on the second information, change a parameter setting of the sensor based on the determined reliability, obtain, from the sensor of which the parameter setting is changed, third information related to the distance to the object, obtain fourth information including the distance information of the plurality of cells based on the first information and the third information, and obtain the distance to the object based on the distance information included in the fourth information.

The processor may be further configured to set region of interest (ROI) including the at least one cell, and change the parameter setting of the sensor based on a reliability of cells included in the ROI.

The processor may be further configured to determine a number of cells belonging to each reliability range in the ROI among ranges of the reliability, obtain parameter setting information corresponding to a reliability distribution of the cells included in the ROI based on reliability-parameter setting information, and change the parameter setting of the sensor based on the parameter setting information.

The processor may be further configured to, based on the reliability of the cells included in the ROI, change at least one of a parameter value for adjusting luminous intensity of the sensor or a parameter value for adjusting an exposure time to light.

A reliability of the third information may be higher than the reliability of the first information.

The processor may be further configured to determine, in the third information, a plurality of cells included in a region of interest (ROI) set based on the first information, obtain distance information of the plurality of cells included in the ROI, and obtain the fourth information based on the first information and the distance information of the plurality of cells included in the ROI, The sensor may determine a cell having reliability equal to or less than a threshold value of the plurality of cells based on the second information, and generate the first information set to a preset value of the distance information of the cell having the reliability below or equal to the threshold value.

The processor may be further configured to identify a plurality of cells included in a preset region of interest (ROI) among the plurality of cells corresponding to the plurality of pixels constituting the sensor, determine a reliability of the plurality of cells included in the ROI based on the second information, and change the parameter setting of the sensor based on the determined reliability of the plurality of cells included in the ROI.

The processor may be further configured to identify, based on the second information, a number of cells having a reliability value less than or equal to a preset threshold value among the plurality of cells corresponding to the plurality of pixels constituting the sensor, based on the number of the cells having the reliability value less than or equal to the preset threshold value being greater than or equal to a preset number, change the parameter setting of the sensor, and obtain, from the sensor of which the parameter setting is changed, the third information including distance information.

The processor may be further configured to apply a weight to a reliability value of the at least one cell based on the identified position of the at least one cell, and change the parameter setting of the sensor based on the reliability value of the at least one cell to which the weight is applied.

The processor may be further configured to, based on the first information, identify at least one cell of which a reliability is less than or equal to a threshold value among the plurality of cells, and obtain the fourth information of which the distance information of the at least one cell exceeds the threshold value based on the first information and the third information.

According to an aspect of the disclosure, a control method of an electronic apparatus may include: obtaining, from a sensor of the electronic apparatus, first information related to a distance to an object and second information related to a reliability of the first information; identifying at least one cell not including distance information, among a plurality of cells corresponding to a plurality of pixels constituting the sensor, based on the first information; determining a reliability of the at least one cell based on the second information; changing a parameter setting of the sensor based on the determined reliability; obtaining, from the sensor of which the parameter setting is changed, third information related to the distance to the object; obtaining fourth information including the distance information of the plurality of cells based on the first information and the third information; and obtaining the distance to the object based on the distance information included in the fourth information.

The changing the parameter setting may include setting a region of interest (ROI) including the at least one cell, and changing the parameter setting of the sensor based on a reliability of cells included in the ROI.

The changing the parameter setting may include determining a number of cells belonging to each reliability range in the ROI among ranges of the reliability, obtaining parameter setting information corresponding to a reliability distribution of the cells included in the ROI based on reliability-parameter setting information, and changing the parameter setting of the sensor based on the parameter setting information.

The changing the parameter setting may include, based on the reliability of the cells included in the ROI, changing at least one of a parameter value for adjusting luminous intensity of the sensor or a parameter value for adjusting an exposure time to light.

A reliability of the third information may be higher than a reliability of the first information.

The obtaining the fourth information may determine a plurality of cells included in the ROI set based on the first information, in the third information, obtain the distance information of a plurality of cells included in the ROI, and obtain the fourth information based on the first information and the obtained distance information.

The sensor may determine a cell having reliability equal to or less than a threshold value of the plurality of cells based on the second information, and generate the first information set to a preset value of the distance information of the cell having the reliability below or equal to the threshold value.

The changing the parameter setting may identify a plurality of cells included in a preset ROI among a plurality of cells corresponding to a plurality of pixels constituting the sensor, determine reliability of a plurality of cells included in the ROI based on the second information, and change parameter setting of the sensor based on the determined reliability.

The obtaining the third information may determine a number of cells having a reliability value less than or equal to a preset threshold value among a plurality of cells corresponding to a plurality of pixels constituting the sensor based on the second information, based on a number of cells having a reliability value less than or equal to the preset threshold value being greater than or equal to a preset number, change the parameter setting of the sensor, and obtain the third information including distance information from the sensor of which the parameter setting is changed.

The changing the parameter setting may apply a weight to a reliability of the plurality of determined cells based on the identified position of the plurality of cells, and change parameter setting of the sensor based on the reliability of a plurality of cells to which the weight is applied.

The obtaining the fourth information may, based on the first information, identify at least one cell of which a reliability is less than or equal to a threshold value among a plurality of cells including distance information, and obtain the fourth information of which the distance information of the at least one identified cell exceeds the threshold value based on the first information and the third information.

According to various embodiments, an electronic apparatus capable of sensing distance to an object having a dark color such as black color and a control method thereof may be provided.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4A illustrates a first reliability distribution according to an embodiment of the disclosure;

FIG. 4B is a diagram illustrating a second reliability distribution according to an embodiment of the disclosure;

FIG. 4C is a diagram illustrating reliability-parameter setting information according to an embodiment of the disclosure;

FIG. 7B is a diagram illustrating an embodiment of changing a parameter setting of a sensor based on a weight according to an embodiment of the disclosure;

DETAILED DESCRIPTION

The terms used in this specification and claims have chosen general terms in consideration of the functionality of the disclosure. However, these terms may vary depending on the intended or legal interpretation of the technician or the emergence of the new technology, which is known in the art. In addition, some terms may optionally be used by the applicant. Such terms may be interpreted in the sense defined herein, and may be interpreted based on the overall contents of the disclosure and ordinary skill in the art without the definition of a specific term.

When it is decided that a detailed description for the known art related to the disclosure may unnecessarily obscure the gist of the disclosure, the detailed description of the known art may be shortened or omitted.

Various example embodiments will be described in greater detail below with reference to the attached drawings, but it will be understood that the disclosure is not limited by the various example embodiments described herein.

Hereinafter, the embodiment will be described in greater detail below with reference to the drawings.

Figure 1:
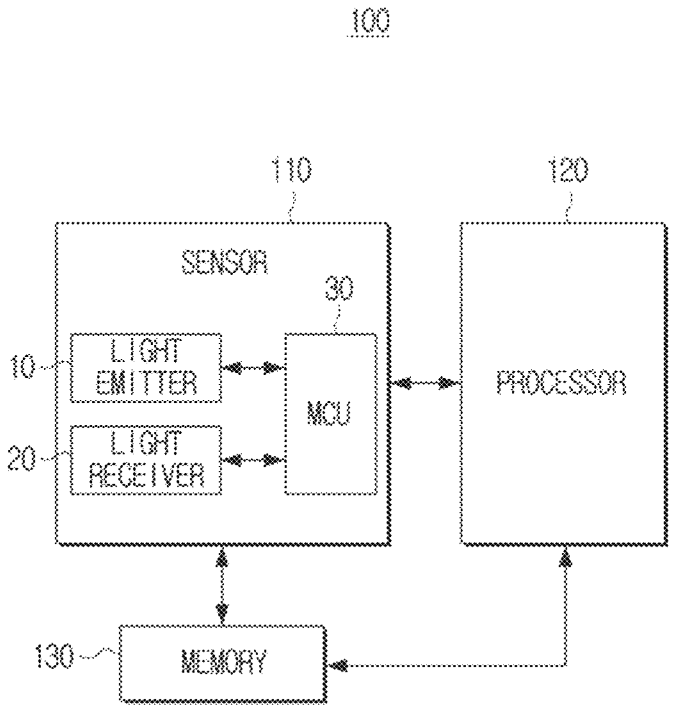
FIG. 1 is a block diagram illustrating an electronic apparatus according to an embodiment of the disclosure.

FIG. 1 is a block diagram illustrating an electronic apparatus according to an embodiment of the disclosure.

An electronic apparatus 100 according to an embodiment of the disclosure may include a sensor 110, a processor 120, and a memory 130.

The sensor 110 is configured to output information about a distance to an object. Referring to FIG. 1, the sensor 110 according to an embodiment of the disclosure may be a time of flight (ToF) sensor including a light emitter 10, a light receiver 20, and a microcontroller unit (MCU) 30. The ToF sensor 110 is a sensor that measures the distance to the object by measuring the time until the light radiated by the light emitter 10 is reflected by the object and received at the light receiver 20. The light emitter 10 may be an IR light source radiating infrared light modulated by a signal of a certain frequency, and the light receiver 20 may be an image sensor that receives light reflected by an object, as an example. However, the light emitter 10 of the disclosure may be implemented as various light sources capable of radiating light such as ultrasonic waves or lasers, and the light receiver 20 may be implemented with various light receiving sensors capable of receiving light such as RGB sensors.

The MCU 30 of the sensor 110 may control the light emitter 10 to radiate light based on the control signal received from the processor 120. The MCU 30 may output information about the distance between the sensor 110 and the object based on the time for the light radiated by the light emitter 10 and reflected by the object to be received by the light receiver 20. The MCU 30 may determine a distance between the sensor 110 and the object through an operation based on a light speed c and time t from when the light is radiated by the light emitter 10 to when the light reflected by the object is received by the light receiver 20.

According to an embodiment, the MCU 30 may detect a phase change with respect to a time until the light radiated by the light emitter 10 and reflected by the object is received by the light receiver 20, thereby outputting information on a distance between the sensor 110 and the object. The MCU 30 may determine a distance between the sensor 110 and the object through an operation distance=c/(2f)*(n+θ/2 (pi)) based on the light speed c, the modulation frequency f, the phase period n, and the phase θ of the received light. As described above, the distance between the sensor 110 and the object may be determined by using the phase change, but hereinafter, it is assumed that the MCU 30 determines the distance between the sensor 110 and the object based on the time t until the light emitted by the light emitter 10 and reflected by the object is received by the light receiver 20.

The information about the distance between the sensor 110 and the object output by the sensor 110 is referred to as the first information. According to an embodiment, the first information may be referred to as distance information, depth information, or distance map or depth map. An example of the first information is described below with reference to FIG. 2A.

Referring to FIG. 1, although the MCU 30 is included in the sensor 110 in FIG. 1, the sensor 110 may include a light emitter 10 and a light receiver 20, and the function of the MCU 30 may be performed by the processor 120. In this example, the light emitter 10 may radiate light on the basis of the control signal received from the processor 120, and the processor 120 may determine the distance between the sensor 110 and the object based on the time until the light radiated by the light emitter 10 and reflected by the object is received by the light receiver 20.

The electronic apparatus 100 may include the memory 130.

As described below, the memory 130 may store first information, second information output by the sensor 110, and reliability-parameter setting information to determine the distance between the sensor 110 and the object by the control of the MCI 30 and the processor 130. The details will be described later.

Figure 2A:
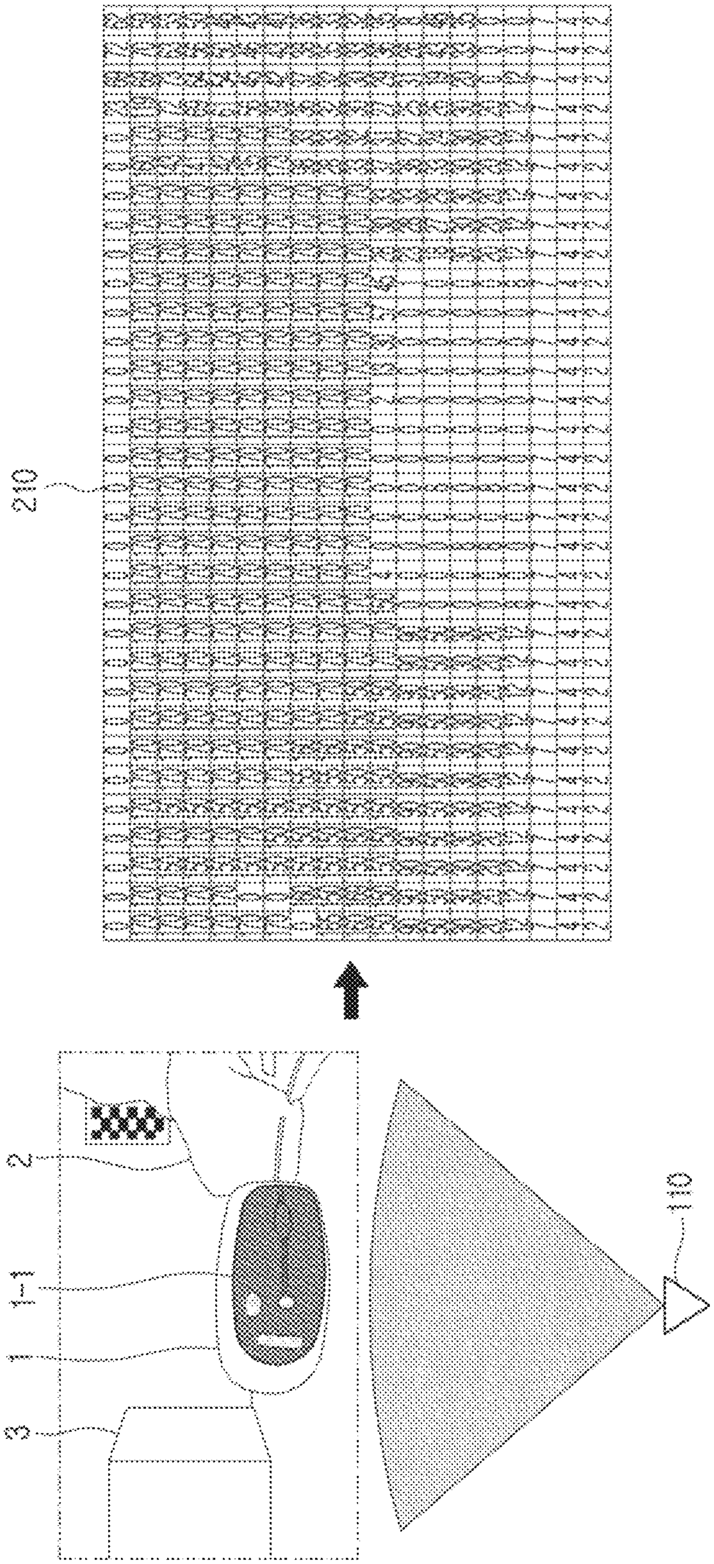
FIG. 2A is a diagram illustrating first information according to an embodiment of the disclosure.

FIG. 2A is a diagram illustrating first information according to an embodiment of the disclosure.

As described above, the MCU 30 of the sensor 110 may determine the distance between the sensor 110 and the object based on the time until the light radiated by the light emitter 10 is reflected by the object and received by the light receiver 20.

The MCU 30 may determine a distance to an object reflecting light for each of a plurality of pixels constituting the light receiver 20. Here, each of the plurality of pixels constituting the light receiver 20 according to an embodiment may include an in phase receptor and an out phase receptor.

For example, while the light emitter 10 emits light, the in phase receptor is activated and light is received, and while the light emitter 10 does not emit light (for example, while the light emitter 10 is turned off), the out phase receptor may be activated to receive light.

As an example, if the distance between the sensor 110 and the object is 0, only the in phase receptor may receive the light radiated by the light emitter 10 and reflected to the object, and the out phase receptor may not receive the light. As another example, if the distance between the sensor 110 and the object is not 0, it takes a predetermined time until light radiated by the light emitter 10 is reflected by the object and reaches the light receiver 20, so that a portion of the light radiated by the light emitter 10 and reflected by the object may be received by the in phase receptor and the rest may be received by the out phase receptor.

The MCU 30 may identify the distance to the object based on the time when the in phase receptor receives the light and the time difference in which the out phase receptor receives the light.

As shown in FIG. 2A, when the light radiated by the light emitter 10 is reflected by the light emitter 10 (refer to FIG. 2A, the object may refer to a mouse 1, a person's arm 2, a wall surface 3, etc.), and is received at each of a plurality of pixels, it is possible to determine the time when light is received for each of the plurality of pixels.

The plurality of pixels constituting the light receiver 20 may include a timer for measuring the reception time of the light and a time to digital (TDC) converter for converting the measured time into a digital signal, and the MCU 30 may determine the time at which light is received for each of the plurality of pixels based on the signal output from the TDC converter. The MCU 30 may determine a distance to an object for each of a plurality of pixels through an operation based on a time delay, that is, time until the light is radiated by the light emitter 10 and then received at each of a plurality of pixels, and a moving speed of the light, and may output the first information 210 including information on the determined distance. For example, the MCU 30 may identify the time at which the in phase receptor and the out phase receptor constituting the pixel receive light and identify the distance to the object based on the phase difference between the two times. However, it is to be understood that embodiments are not limited to this example.

In another example, each of the in phase receptor and the out phase receptor may receive a plurality of lights and identify a distance to the object based on a phase difference of the time that each of the plurality of lights has been received. For example, the light emitter 10 may sequentially emit a plurality of lights at a predetermined time interval (e.g., 0.1 s interval). Each of the in phase receptor and the out phase receptor may receive a plurality of light radiated by a predetermined time interval, and the MCU 30 may identify a time that each of the in phase receptor and the out phase receptor receive the plurality of lights, and may identify a distance to the object based on a phase difference of the plurality of identified times. It is to be understood that the specific time interval in the above example is for convenience of description and is not limited thereto.

The MCU 30 may identify a distance from each of the plurality of pixels constituting the light receiver 20 to the object, and store the first information 210 including the information on the identified distance in the memory 130.

As shown in FIG. 2A, the first information 210 may include distance information between the objet and each of the plurality of pixels identified in each of the plurality of pixels constituting the light receiver 20. First, each of a plurality of cells constituting the first information 210 shown in FIG. 2A corresponds to a pixel, and the numbers included in the plurality of cells is a value representing a distance from a pixel identified by the MCU 30 to an object through the above-described operation method as an example of distance information, and the unit may be centimeters (cm), but is not limited thereto.

Referring to FIG. 2A, the object may include the mouse 1, a person's arm 2, a wall surface 3, and the like. The objects corresponding to each of the plurality of pixels constituting the light receiver 30 may be the same or different.

For example, the object corresponding to the first pixel among the plurality of pixels constituting the light receiver 20 may be the mouse 1, and the first pixel may receive light reflected to the mouse 1. In this example, the distance information of the first pixel identified by the MCU 30 may mean a distance between the sensor 110 and the mouse 1.

As another example, the object corresponding to the second pixel among the plurality of pixels constituting the light receiver 20 is the arm 2 of the person, and the second pixel may receive light reflected to the arm 2 of the person. In this example, the distance information of the second pixel identified by the MCU 30 may mean the distance between the sensor 110 and the arm 2 of the person.

Referring to the first information 210 of FIG. 2A, each of the plurality of pixels may receive light reflected from a different object (e.g., one of the mouse 1, the person's arm 2, and the wall surface 3), and even if each of the plurality of pixels receives light reflected from the same object (e.g., an upper end or a lower end of the wall surface 3), the distance information corresponding to the plurality of cells may be different.

As described above, each of the plurality of cells may correspond to a plurality of pixels constituting the light receiver 20, and the number of the plurality of cells may mean a distance from a corresponding pixel to an object identified in the corresponding pixel.

Referring to the first information 210 of FIG. 2A, the distance information corresponding to the plurality of pixels is different from each other. This is because if the distance between the sensor 110 and the object is different, the time (i.e., the time of flight of light) of the light radiated by the light emitter 10 is different from the time (i.e., the flight time of the light) received in each of the plurality of pixels. For example, referring to FIG. 2A, the distance information of a cell corresponding to a pixel receiving light reflected by an object (e.g., a person's arm, etc.) located at a relatively near distance from the sensor 110 may include information about a distance that is relatively shorter than the distance information of a cell corresponding to a pixel receiving light reflected by an object (e.g., a wall surface, etc.) located at a relatively far distance from the sensor 110.

Referring to the first information 210 of FIG. 2A, the information of the distance corresponding to some cells of a plurality of cells is 0.

As described above, in that the sensor 110 measures the distance to the object on the basis of the light reflected by the object, the sensor 110 may not measure the distance to the object when the amount of light reflected from the object and received at the light receiver 20 is less than or equal to the threshold value, if the light amount is less than or equal to a threshold value. For example, in the case of an object having a dark color (for example, a part of the mouse 1 of FIG. 2A), such as a black color, the light radiated to the object is mostly absorbed on the surface of the object, and the amount of light reflected from the object and received at the light receiver 20 may be less than or equal to a threshold value.

In this example, the sensor 110 may output the distance information of the cell corresponding to the pixel receiving the light having the intensity of less than or equal to the threshold value to 0. For example, as shown in FIG. 2A, the distance information of a cell corresponding to a pixel receiving light reflected from an object 1-1 (e.g., a partial area of a mouse 1) of a plurality of cells may be 0. The output value of 0 is merely an example, and according to an embodiment, the sensor 110 may output the distance information of the cell corresponding to the pixel receiving the light having the intensity of less than or equal to the threshold value to another specific value, such as an infinity value.

If the distance information is 0, the distance between the sensor 110 and the object may be 0, and the distance to the object may not be accurately measured due to a problem of insufficient light amount. Accordingly, in the disclosure, it may be determined whether the distance information (i.e., a value of 0) of a cell having an output value of 0 is accurate based on reliability information (hereinafter, referred to as second information) for each of the plurality of cells. Hereinafter, FIG. 2B will referred to.

Figure 2B:
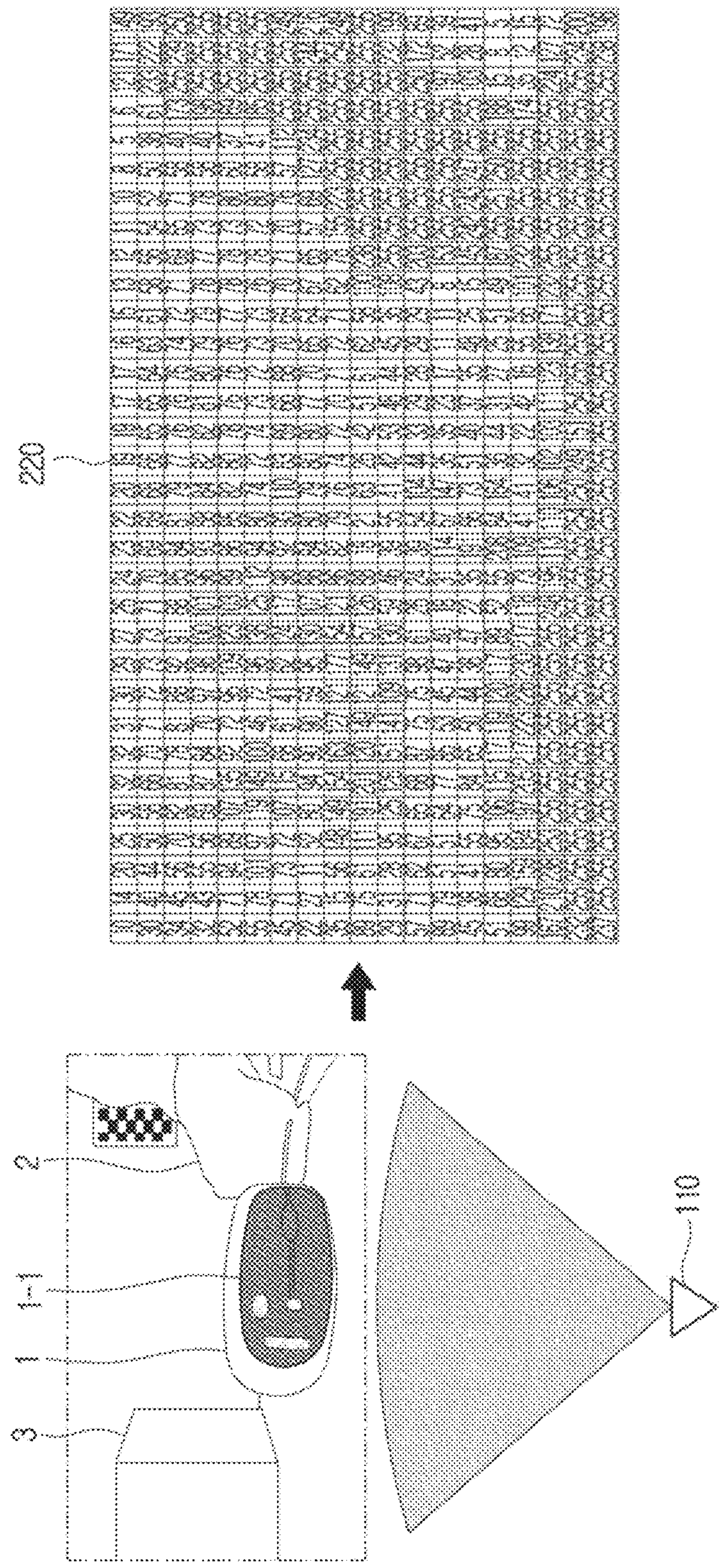
FIG. 2B is a diagram illustrating second information according to an embodiment of the disclosure.

FIG. 2B is a diagram illustrating second information according to an embodiment of the disclosure.

The sensor 110 may output second information including reliability information for the first information 210.

In detail, the MCU 30 of the sensor 110 may output the second information 220 indicating the reliability of the distance information corresponding to each cell constituting the first information 210. The reliability may be a value for the accuracy of distance information corresponding to each cell constituting the first information 210. The MCU 30 may determine the reliability of the distance information measured for each pixel constituting the light receiver 20 based on a plurality of charge amounts measured as a plurality of lights of different phase shifts are received by the light receiver 20. For example, when a plurality of lights having four phase shifts (e.g., 0 degrees, 90 degrees, 180 degrees, and 270 degrees) are sequentially radiated through the light emitter 10 according to the control of the MCU 30, the light receiver 20 may sequentially receive a plurality of light having four phase shifts.

The MCU 30 may determine the reliability of the distance information corresponding to each of the plurality of pixels through a reliability=root [(Q1q2)^2+(Q3−Q4)^2] operation. For example, the MCU 30 may perform an operation of root[(Q1−Q2)^2+(Q3−Q4)^2] based on the amount of charge Q1 measured as the first pixel, among a plurality of pixels constituting the light receiver 20, receives light of the first phase shift, the amount of charge Q2 measured as the first pixel receives the light of the second phase shift, the amount of charge Q3 measured as the first pixel receives the light of the third phase shift, and the amount of charge Q4 measured as the first pixel receives the light of the fourth phase shift, and may obtain the reliability of the distance information included in the cell corresponding to the first pixel. The MCU 30 may obtain the reliability of the distance information corresponding to each of the plurality of pixels using the method (operation) described above.

This is merely an example, and the reliability of the first information 210 may be determined through various methods, such as using a neural network model trained to output reliability corresponding to each pixel by using difference of distance information between pixels adjacent to a specific pixel or distance information measured for each pixel as input data. As another example, the light emitter 10 may sequentially radiate a plurality of lights having less than four phase shifts (e.g., 0 degrees and 180 degrees), or more than four phase shifts (e.g., 0 degrees, 45 degrees, 90 degrees, 135 degrees, 180 degrees, 225 degrees, 270 degrees, 315 degrees, 360 degrees, etc.), and the light receiver 20 may sequentially receive a plurality of light having different phases. Subsequently, the MCU 30 may measure the reliability of the corresponding pixel based on the amount of charge measured in the pixels according to the plurality of received light, and accordingly, the MCU 30 may obtain the reliability of the distance information corresponding to each of the plurality of pixels.

The second information 220 may include reliability information for the first information 210, as described above, and may be referred to as reliability information or a reliability map according to an embodiment.

For example, as shown in FIG. 2B, when light is radiated toward an object, a plurality of pixels constituting the light receiver 20 may receive light reflected by an object, and the MCU 30 may output second information 220 including a reliability value for each cell corresponding to each pixel through the above-described operation method. The MCU 30 may then store the second information 220 in the memory 130.

As shown in FIG. 2B, the second information 220 may include a cell corresponding to each of the plurality of pixels constituting the light receiver 20 and reliability information corresponding to the corresponding cell. Here, the reliability information is information including the reliability value calculated through the above-described calculation method, and the reliability value may have a value of 0 to 255 as an example, but is not limited thereto. A cell having a relatively high value of reliability may be seen to include distance information of higher accuracy than cells having a relatively low value of reliability. It is to be understood that the shape/distribution of the second information 220 composed of the cells corresponding to each of the plurality of pixels shown in FIG. 2B is an example and is not limited thereto.

Referring to the second information 220 of FIG. 2B according to an embodiment of the disclosure, the reliability value of the cell corresponding to the pixel receiving the light having the light intensity below the threshold value has a relatively small value (e.g., a reliability value of 50 or less) compared to the reliability value of the cell corresponding to other pixels. As described in FIG. 2A, a pixel receiving light having a light quantity below or equal to a threshold value may be a pixel that receives light reflected from an object having a dark color such as a black color.

In this example, the MCU 30 may determine a cell having a reliability value below or equal to a threshold value among the plurality of cells based on the second information 220, and set the distance information of the cell having the reliability value less than or equal to a threshold value among the plurality of cells included in the first information 210 to 0, thereby outputting the first information 210 as shown in FIG. 2A.

As described above, in that the sensor 110 measures the distance to the object based on the light reflected by the object, and thus it is difficult to measure the distance to the object when the amount of light reflected from the object and received to the light receiver 20 is insufficient. As an example, as for the light radiated to the object of the black color, most of light is absorbed to the surface of the object, so that the amount of light received in the light receiver 20 may be insufficient.

The sensor 110 may not measure the distance to the object of the black color due to the insufficient amount of light received by the light receiver 20.

This may particularly have a limitation on the driving of an electronic apparatus (e.g., a mobile robot or an autonomous vehicle) that operates based on a distance to the object, and may cause a collision between the electronic apparatus and the object.

To solve this problem, the processor 120 of the disclosure may change a parameter setting of the sensor 110 when at least one cell in which the distance information is not detected is included in the first information 210, and additionally obtain third information including the distance information from the sensor 110 in which the parameter setting is changed. The changing of the parameter setting may mean that a parameter value set in at least one parameter of the plurality of parameters may be changed. As an example, the parameter may be a parameter for adjusting the light intensity of the light emitter 10 or a parameter for adjusting an exposure time with respect to light. However, this is merely an example and the parameter of the sensor 110 may be various parameters such as parameters for changing the modulation frequency of light, and the technical idea of the disclosure is not limited to the embodiments described herein. This will be described in detail with reference to FIG. 3.

Figure 3:
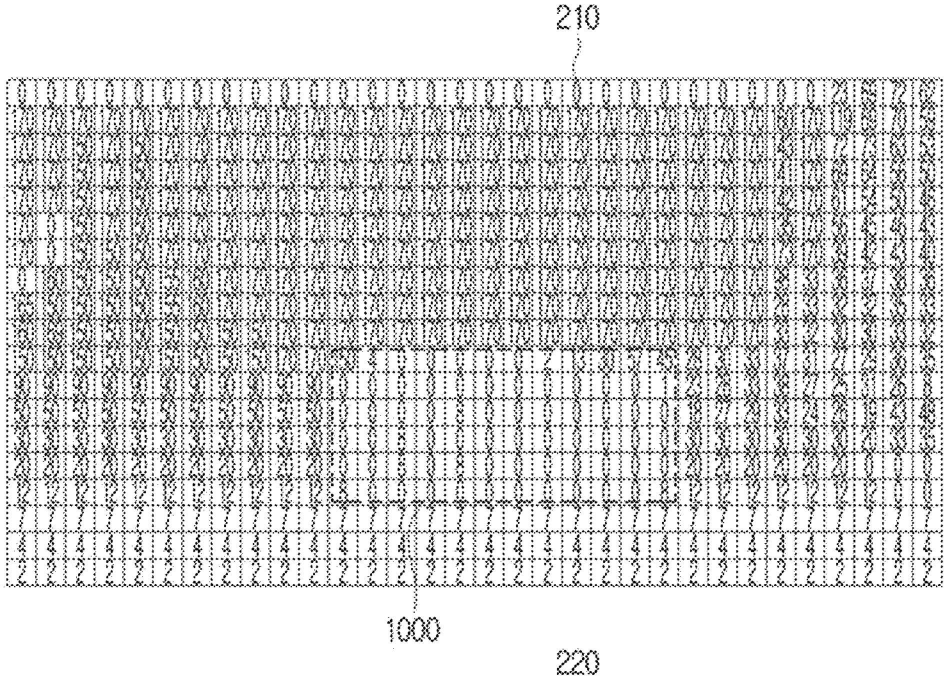
FIG. 3 is a diagram illustrating an example of setting a region of interest (ROI) based on at least one cell in which distance information is not detected according to an embodiment of the disclosure.
Figure 3:
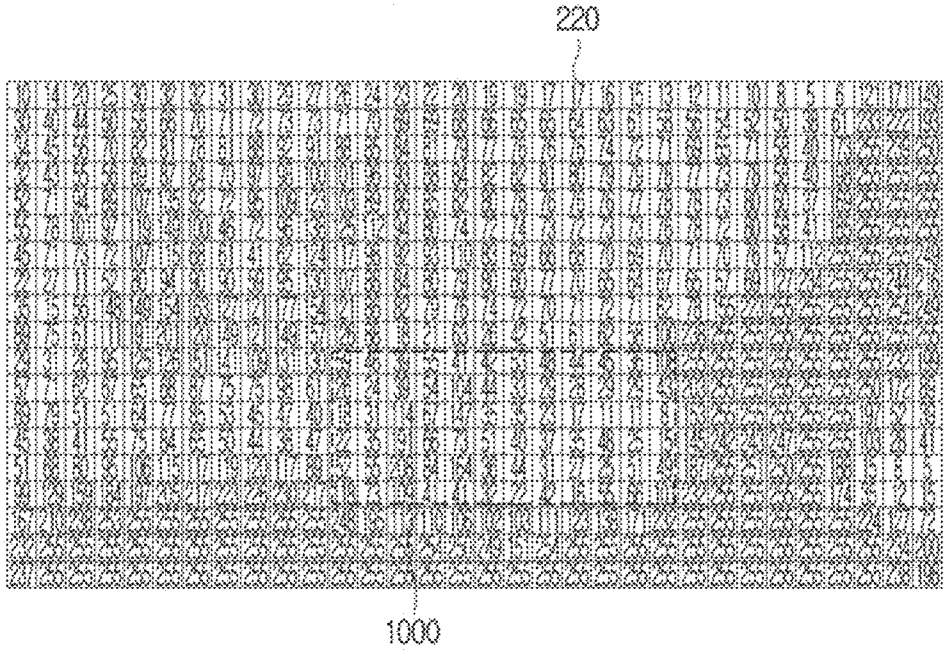

FIG. 3 is a diagram illustrating an example of setting a region of interest (ROI) based on at least one cell in which distance information is not detected according to an embodiment of the disclosure The processor 120 may control the sensor 110 to radiate light through the light emitter 10. The processor 120 may receive the first information 210 generated by the MCU 30 from the sensor 110 as the light reflected as the object is received by the light receiver 20. The first information 210 may include distance information, as described above.

As described above, the first information 210 may be generated by the processor 120. The processor 120 may control the light emitter 10 of the sensor 110 to radiate light, and may determine (or calculate) a distance between the sensor 110 and the object based on the flight time of the light when the light radiated by the light emitter 10 is reflected by the object and received by the light receiver 20.

The processor 120 may receive the second information 220 including the reliability information for the distance information of the first information 210 from the sensor 110.

As described above, the sensor 110 may output the second information 220 indicating the reliability of the distance information corresponding to each pixel constituting the light receiver 20. The reliability may be a value for the accuracy of distance information corresponding to each pixel constituting the light receiver 20.

The second information 220 may be generated by the processor 120. The processor 120 may control the light emitter 10 of the sensor 110 to radiate light, and determine the reliability of the distance information corresponding to each pixel constituting the light receiver 20 using the charges Q and the phase shift measured on the basis of the amount of light received by the light receiver 20 when the light radiated by the light emitter 10 is reflected by the object and received by the light receiver 20. For example, if the light receiver 20 receives light with four different phase shifts, the processor 120 may determine the reliability of the distance information corresponding to each pixel through a reliability=root [(Q1−Q2)^2+(Q3−Q4)^2] operation.

As described above, when the amount of light reflected by the object and received by the light receiver 20 is insufficient, that is, when the amount of the light received by the light receiver 20 is less than or equal to the minimum threshold value required for measuring the distance, the sensor 110 may output a value of 0 as the distance information of the cell corresponding to the pixel receiving the light reflected from the corresponding object.

When the first information 210 including the distance information is received from the sensor 110, the processor 120 may identify at least one cell having an output value of value 0 indicating no distance information among the plurality of cells corresponding to the plurality of pixels constituting the light receiver 20 based on the distance information. The at least one identified cell may be a cell corresponding to a pixel that has received an amount of light below or equal to a minimum threshold value required for distance measurement. The processor 120 may set a region of interest (ROI) including the identified at least one cell to the first information 210 and the second information 220. For example, the ROI may be a square-shaped region of a minimum size including at least one cell having an output value of 0. The ROI may have various shapes such as a circle, a closed curve, and a polygon including at least one cell. For example, as shown in FIG. 3, the processor 120 may identify at least one pixel having an output value of 0 indicating no distance information based on the first information 210 or the second information 220 of the plurality of pixels constituting the light receiver 20, and set an ROI 1000 including the cell corresponding to the identified pixel.

The processor 120 may change the parameter setting of the sensor 110 based on the reliability information corresponding to the ROI 1000.

The processor 120 may determine the reliability of at least one cell constituting the ROI 1000 based on the reliability information included in the second information 220 when the ROI 1000 is set.

The processor 120 may change the parameter setting of the sensor 110 based on the reliability of the at least one cell constituting the ROI 1000.

First, the processor 120 may identify a reliability distribution (or histogram) of a plurality of cells constituting the ROI 1000 to change the parameter settings of the sensor 110. The processor 120 may then obtain parameters for changing the operation, settings of the sensor 110 based on the identified reliability distribution and the reliability-parameter setting information pre-stored in the memory 130.

For example, the parameter of the sensor 110 may include a parameter for adjusting the light intensity of the light emitter 10 or a parameter for adjusting an exposure time for light. However, this is merely an example and the parameter of the sensor 110 may be various parameters such as parameters for changing the modulation frequency of light, and the technical idea of the disclosure is not limited to the embodiments described herein.

The processor 120 may determine the reliability of each of the plurality of cells included in the ROI 1000. The processor 120 may determine the number of cells belonging to the corresponding reliability range for each reliability range.

For example, referring to FIGS. 4A and 4B, the processor 120 may determine the number of cells having a reliability between 0 and 25 in an ROI identified based on the first information 210, the number of cells having a reliability between 26 and 50, . . . , the number of cells having reliability between 226 and 255 based on the second information 220. The reliability range of 25 units may be variously set according to embodiments. FIGS. 4A and 4B illustrate an embodiment of determining the number of cells belonging to the corresponding reliability range for each reliability range, and the technical idea is to be applied when determining the number of cells according to the range of reliability in the ROI 1000 as shown in FIG. 3.

The processor 120 may then obtain a parameter of the sensor 110 corresponding to the ROI 1000 based on the reliability distribution of the plurality of cells constituting the ROI 1000 and the reliability-parameter setting information previously stored in the memory 130. The processor 130 may then change the parameter settings of the sensor 110 to correspond to the obtained parameters.

An example of the reliability-parameter setting information pre-stored in the memory 130 is shown in FIG. 4C. For example, the reliability-parameter setting information may include parameter setting information for changing the parameter setting of the sensor 110 based on the number of cells having a reliability value lower than the minimum threshold value for distance measurement. For example, referring to FIG. 4C, if a number of cells having a reliability value lower than the minimum threshold value for distance measurement included in the ROI is greater than a first predetermined number (for example, 51 or more), the parameter setting information for increasing the light intensity of the light emitting unit 10 by a1 times, the parameter setting information for increasing the exposure time for the light by b1 times, or the parameter setting information for increasing the exposure time of the light emitting unit 10 by a11 times, and the parameter setting information for increasing the exposure time of the light by b11 times may be stored.

If the number of cells having the reliability value lower than the minimum threshold value for distance measurement is greater than or equal to a second predetermined number (e.g., 31) and less than the first predetermined number (e.g., 51), the reliability-parameter setting information may be stored with the parameter setting information for increasing the luminous intensity of the light emitter 10 by a2 times, the parameter setting information for increasing the exposure time for the light by b2 times, or the parameter setting information for increasing the light intensity of the light emitter 10 by an a22 times and increasing the exposure time to the light by b22 times.

If the cell having the reliability value lower than the minimum threshold value for distance measurement is greater than or equal to the third predetermined number (e.g., 11) and less than the second predetermined number (e.g., 31) in the ROI, the parameter setting information for increasing the light intensity of the light emitter 10 by a3 times, the parameter setting information for increasing the exposure time for the light by b3 times, or the parameter setting information for increasing the light intensity of the light emitter 10 by a33 times and increasing the exposure time with respect to the light by b33 times, may be stored in the reliability-parameter setting information. The reliability-parameter setting information may be stored with parameter setting information for maintaining the parameter value of the light emitter 10 when the cell having the reliability value lower than the minimum threshold value for measuring the distance is less than the third predetermined number (e.g., 11) in the ROI.

Accordingly, the processor 120 may change the parameter settings of the sensor 110 based on the reliability-parameter setting information and the reliability distribution of the plurality of cells constituting the ROI 1000.

In reliability-parameter setting information, the number of cells having a reliability value lower than the minimum threshold value included in the ROI, the parameter for increasing the intensity, and the parameter for increasing the exposure time for the light may be a proportional relationship. For example, when the number of cells having a reliability value lower than the minimum threshold value included in the ROI is greater than or equal to the first predetermined number (e.g., 51) as compared to the third predetermined number (e.g., 11), the parameter for increasing the light intensity and the parameter for increasing the exposure time for the light may be increased in proportion to the number of cells.

For example, as shown in FIG. 4B, when the number of cells having a reliability value less than or equal to a minimum threshold value (e.g., reliability 50) for distance measurement included in the ROI is greater than the first predetermined number (e.g., at least 51), the processor 120 may change the parameter settings of the sensor 110 to increase the light intensity of the light emitter by a1 times (e.g., 3.5 times), the exposure time for the light by b1 times (e.g., 3.5 times), increase the exposure time for the light by all times (e.g., 2.3 times), or increase the exposure time for the light by b11 times (e.g., 1.5 times).

As shown in FIG. 4B, when a cell having a reliability value less than or equal to a minimum threshold value (e.g., reliability 50) for distance measurement is greater than or equal to the second predetermined number (e.g., at least 31) and less than the first predetermined number of (e.g., less than 50), the processor 120 may change the parameter settings of the sensor 110 to increase the light intensity of the light emitter 10 by a2 times (e.g., twice) based on the reliability-parameter setting information, increase the exposure time for the light by b2 times (e.g., twice), increase the light intensity of the light emitter 10 by a22 times (e.g., 1.3 times), and increase the exposure time of the light by b22 times (e.g., 1.5 times).

The processor 120 may obtain third information including information about the distance between the sensor 110 and the object from the sensor 110 in which the parameter setting is changed. The processor 120 may change the parameter setting of the sensor 110 according to the reliability-parameter setting information, and transmit a control signal for generating third information including the distance information to the sensor 110 in which the parameter setting is changed. In this example, the MCU 30 of the sensor 110 may control the light emitter 10 according to the control signal to emit light, and output third information including information about the distance to the object based on the time until the light reflected by the object is received by the light receiver 20.

The third information 510 may include information about the distance to the object sensed by the sensor 110, which increases the light intensity of the light emitter 10 or increases the exposure time for the light. The distance information included in the ROI 1000 of the third information 510 may have a relatively high reliability when compared to the distance information included in the ROI 1000 of the first information 210. This is because the light receiver 20 may receive the light having more than the minimum threshold value required for measuring the distance by increasing the light intensity of the light emitter 10, and the light receiver 20 may receive the light having more than the minimum threshold value required for distance measurement by receiving the light for a relatively long time according to the increase of the exposure time with respect to the light.

For example, if there are a plurality of ROIs including a plurality of cells having a reliability value lower than the minimum threshold value for distance measurement, the processor 120 may increase the accuracy of driving path identification or increase the exposure time for light to reduce the probability of collision occurrence with the object, even if the time required to measure the distance is increased.

For example, if the time during which the light emitter 10 emits light increases, the activation time of the in phase receptor included in the light receiver 20 that is activated for a period of time when the light emitter 10 emits light, and the activation time of an out phase receptor, which is activated for a time that the light emitter 10 does not emit light may be increased. In this example, as the activation time of the out phase receptor included in the pixel increases, light having a minimum critical value or more required for distance measurement may be received, and the MCU 30 may obtain distance information having a reliability value greater than or equal to a threshold value corresponding to the corresponding pixel.

For example, if there are a plurality of ROIs including a plurality of cells having a reliability value lower than the minimum threshold value for distance measurement, the processor 120 may increase exposure time for light to improve the accuracy of driving path identification of the electronic apparatus 100 or decrease the probability of collision occurrence with the object, even if the time required to measure the distance is increased.

As another example, if there are a plurality of ROIs including a plurality of cells having a reliability value lower than the minimum threshold value for distance measurement, it is possible to increase the luminous intensity of the light emitted by the light emitter 10 for obtaining high reliability distance information, improving the accuracy of driving path identification of the electronic apparatus 100, or reducing the probability of collision occurrence with the object, although it seems somewhat impractical in consideration of hardware specification of IR light source provided in the light emitter 10 (e.g., there is a possibility of malfunction).

Figure 5:
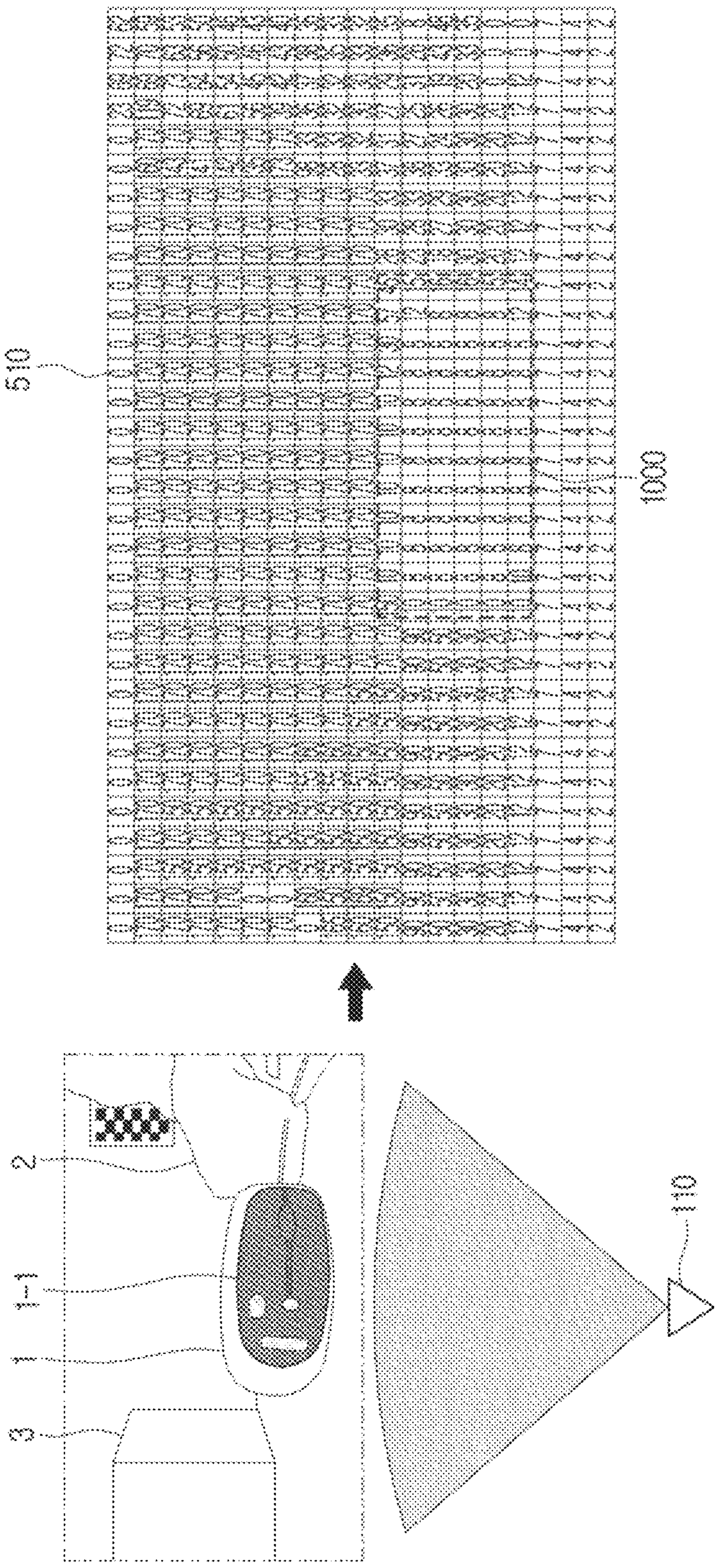
FIG. 5 is a diagram illustrating third information according to an embodiment of the disclosure.

For example, referring to the third information 510 output by the sensor 110 in which the parameter of FIG. 5 is changed, the plurality of cells included in the ROI 1000 include distance information, unlike the first information output by the sensor 110 before the parameter change.

Figure 6A:
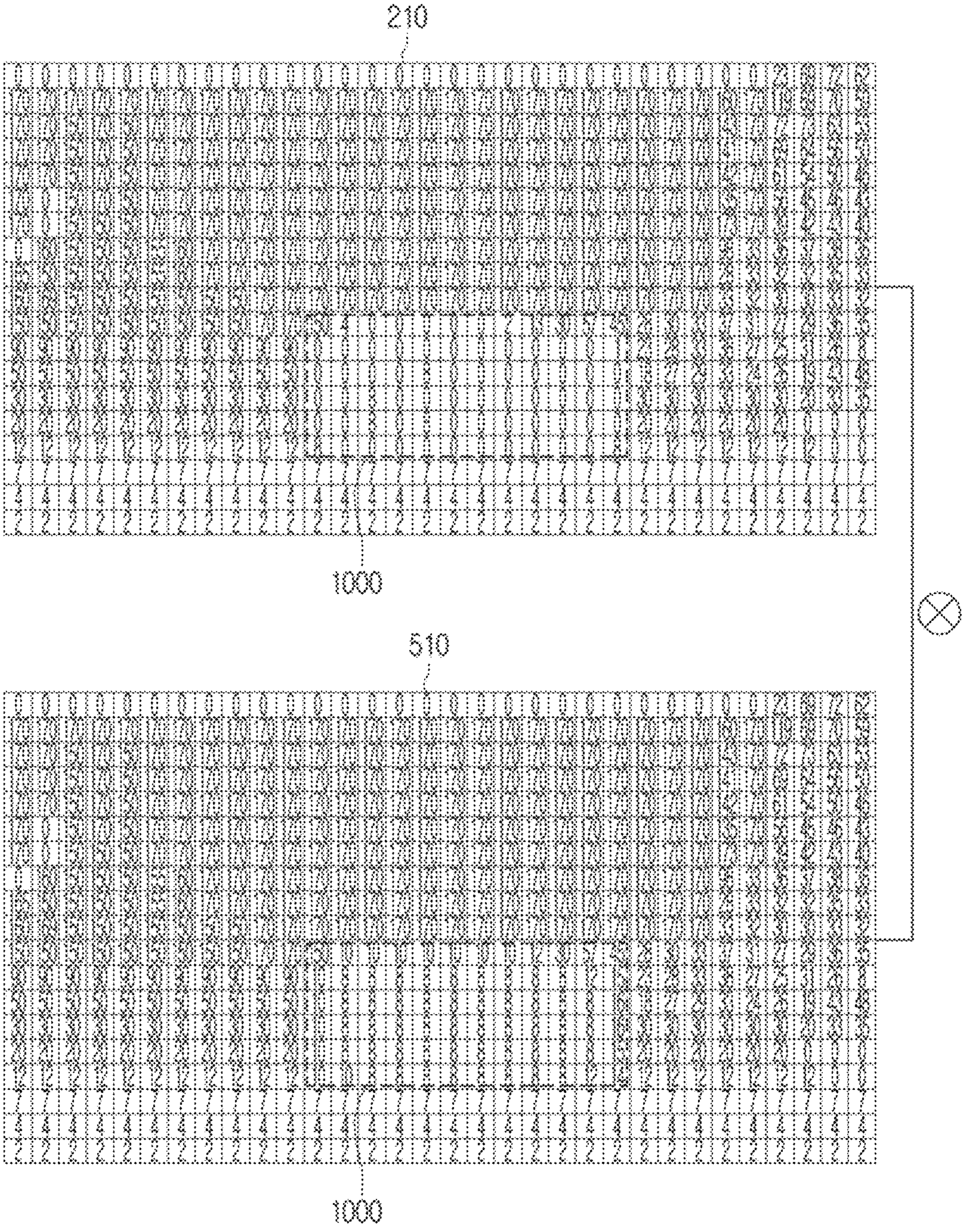
FIGS. 6A and 6B are diagrams illustrating fourth information according to an embodiment of the disclosure.
Figure 6B:
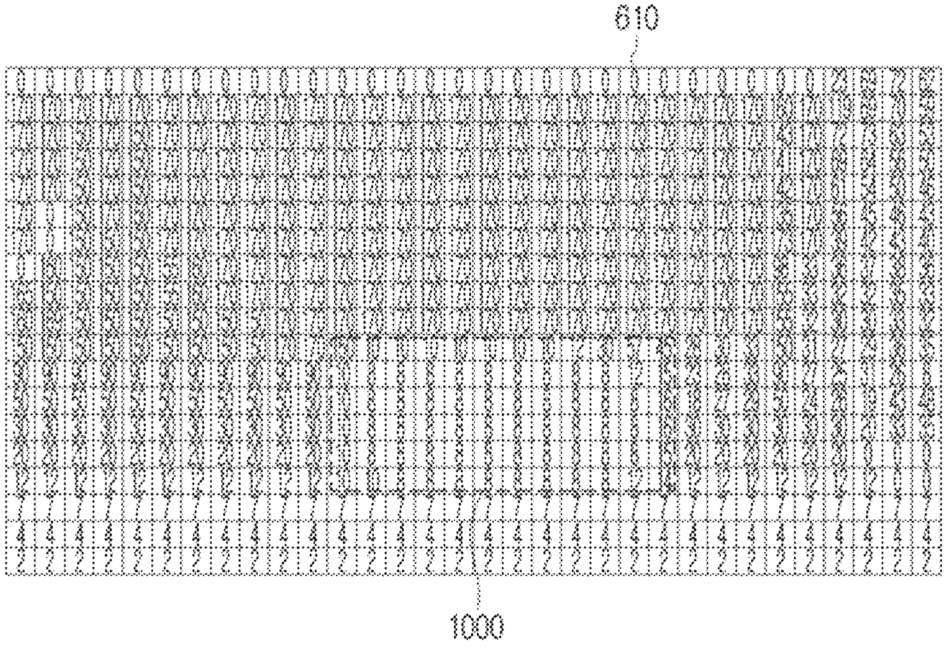

When the third information 510 is received from the sensor 110 in which the parameter setting is changed, as shown in FIG. 6B, the processor 120 may obtain fourth information 610 including the distance information of the plurality of cells based on the distance information of the plurality of cells included in the ROI 1000 of the third information 510 and the distance information of the plurality of cells included in the ROI 1000 of the first information 210.

When the processor 120 receives the third information 510 from the sensor 110, the processor 120 may determine a plurality of cells included in the ROI that is set based on the first information 210 and the third information 510. The processor 120 may change the distance information of the plurality of cells included in the ROI 1000 of the first information 210 based on the distance information of the plurality of cells included in the ROI 1000 of the third information 510. Accordingly, as shown in FIGS. 6A and 6B, the electronic apparatus 100 may obtain changed fourth information 610 based on the distance information of the plurality of cells in which the information of the plurality of cells included in the ROI of the first information 210 is included in the ROI of the third information 510. Alternatively, the processor 120 may generate (or obtain) the fourth information 610 including the distance information of the plurality of cells by converging a plurality of distance information corresponding to the plurality of cells obtained from the first information 210 and a plurality of distance information corresponding to the plurality of cells obtained from the third information 510. The processor 120 may generate fourth information 610 including the distance information of the plurality of cells by converging the ROI 1000 of the third information 510 to the ROI 1000 of the first information 210, as well as generate fourth information 610 including the distance information of the plurality of cells by converging the entire area of the first information 210 with the entire area of the third information 510.

The processor 120 may perform a process such as driving, stopping, or controlling the driving direction of the electronic apparatus 100 based on the distance information included in the fourth information 610. As described above, since the electronic apparatus 100 of the disclosure performs a process such as driving based on the fourth information 610, a problem (e.g., collision with a black color object, etc.) which may occur as a related-art electronic apparatus fails to detect a distance to an object of dark color such as black color may be prevented.

According to an embodiment, the processor 120 may change the parameter setting of the sensor 110 based on the reliability value of the plurality of cells and the weight of the plurality of cells.

The processor 120 may apply a first weight to a reliability value having a cell located at a relatively lower end among a plurality of cells included in the ROI 1000, and apply a second weight to a reliability value having a cell located at an upper end. Here, the first weight may be higher than the second weight. This is because the cell located at the relatively lower end of the plurality of cells is a cell for sensing an object close to the electronic apparatus 100 than the cell located at the upper end, and thus the distance to the object may have to be precisely measured by giving a higher weight.

Figure 7A:
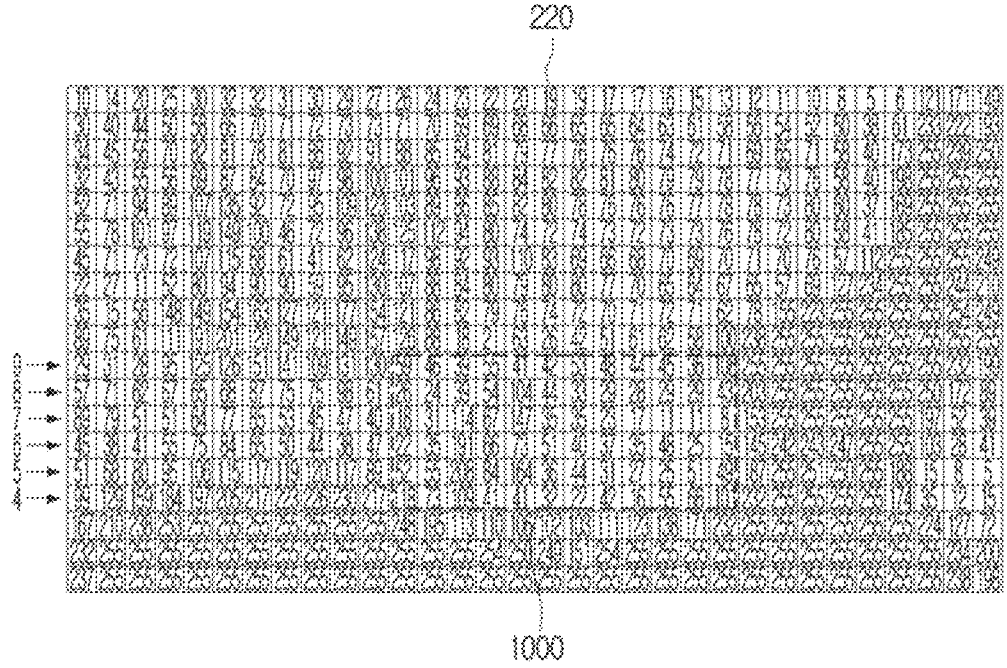
FIG. 7A is a diagram illustrating an embodiment of changing a parameter setting of a sensor based on a weight according to an embodiment of the disclosure.

For example, referring to FIG. 7A, the processor 120 may apply a first weight to a reliability value of a cell located in a fourth row 4 among a plurality of cells included in the ROI 1000, apply a second weight to a reliability value of a cell located in the fifth row 5, and apply a third weight to a reliability value of a cell located in the sixth row 6. Similarly, the processor 120 may apply the fourth weight to the reliability value of the cell located in the seventh row 7 among the plurality of cells included in the ROI 1000, apply the fifth weight to the reliability value of the cell located in the eighth row 8, and apply the sixth weight to the reliability value of the cell located in the ninth row 9. The application of the weight may be an operation of multiplying the reliability value of the cell by a weight. If the weight is w and the reliability value is k, the reliability value to which the weight is applied may be a value of $w*k$.

The processor 120 may sum values applied to each cell included in the ROI 1000, and may obtain an operation value obtained by dividing the sum value by the number n of the plurality of cells included in the ROI 1000. For example, when four pixels having a weight of w1 and a reliability value of k1, a pixel having a weight of w1 and a reliability value of k2, a pixel having a weight of w2 and a reliability value of k3, and a pixel having a weight of w2 and a reliability value of k4 are included, the processor 120 may calculate $(w1*k1+w1*k2+w2*k3+w2*k4)/4$.

The processor 120 may change the parameter setting of the sensor 110 based on the operation value obtained through the operation described above. For example, when the first operation value is obtained, the processor 120 may change the parameter setting of the sensor 110 in order to increase the luminous intensity of the light emitter 10 by x1 times or increase the exposure time for the light by y1 times, and when the second operation value is obtained, the processor 120 may change the parameter setting of the sensor 110 to increase the luminous intensity of the light emitter 10 by x2 times or increase the exposure time to light by y2 times. In a memory of the electronic apparatus 100, plurality of parameter setting information corresponding to a plurality of operation values may be stored. For example, as shown in FIG. 7B, the memory may store the parameter setting information to maintain the parameter setting value of the sensor 110 when the operation value obtained through the operation described above is greater than or equal to 0 and less than the first value, increase the luminous intensity of the light emitting unit 10 by x1 times, increase the luminous intensity of the light emitting unit 10 by y1 times or increase the light exposure time of the light emitting unit 10 by x11 times, and increase the light exposure time by y11 times when the operation value is greater than or equal to the first value and less than the second value. For example, the memory may store the parameter setting information to increase the luminous intensity of the light emitting unit 10 by x2 times, increase the light exposure time of the light emitting unit 10 by y2 times, and increase the light exposure time by x22 times when the operation value is greater than or equal to the second value and less than the third value, and when the operation value is greater than or equal to the third value, the parameter setting information to increase the luminous intensity of the light emitter 10 by x3 times, the light exposure time by y3 times, increase the luminous intensity of the light emitter 10 by x33 times, and light exposure time by y 33 times.

Although the ROI is set based on a plurality of cells that do not include the distance information, the ROI may be previously set according to the embodiment.

Figure 8A:
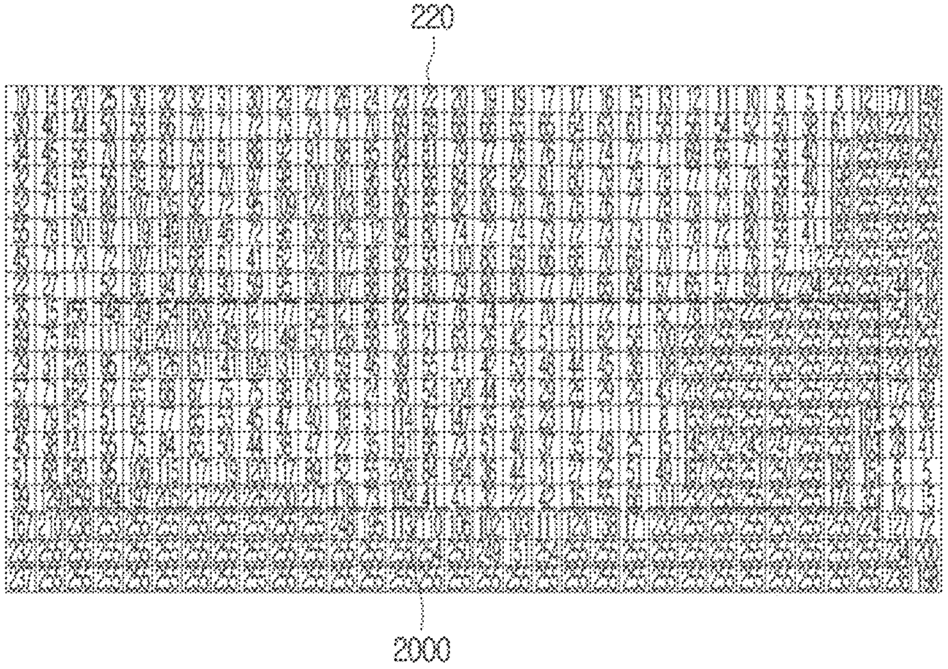
FIG. 8A is a diagram illustrating a predetermined ROI according to an embodiment of the disclosure.

For example, referring to FIG. 8A, an ROI 2000 may be set to a region including a plurality of cells in the center lower region of the plurality of cells.

In this example, the processor 120 may identify a plurality of cells included in a predetermined ROI 2000 among the plurality of cells, and determine the reliability of a plurality of cells included in the ROI 2000 based on the second information. The processor 120 may determine a reliability distribution (or a histogram) of a plurality of cells constituting the ROI 2000. The processor 120 may determine the reliability of each of a plurality of cells included in the ROI 2000, and determine the number of cells belonging to the reliability range for each reliability range. The processor 120 may change the parameter setting of the sensor 110 based on the reliability distribution and reliability-parameter setting information of the plurality of cells constituting the ROI 2000.

Figure 8B:
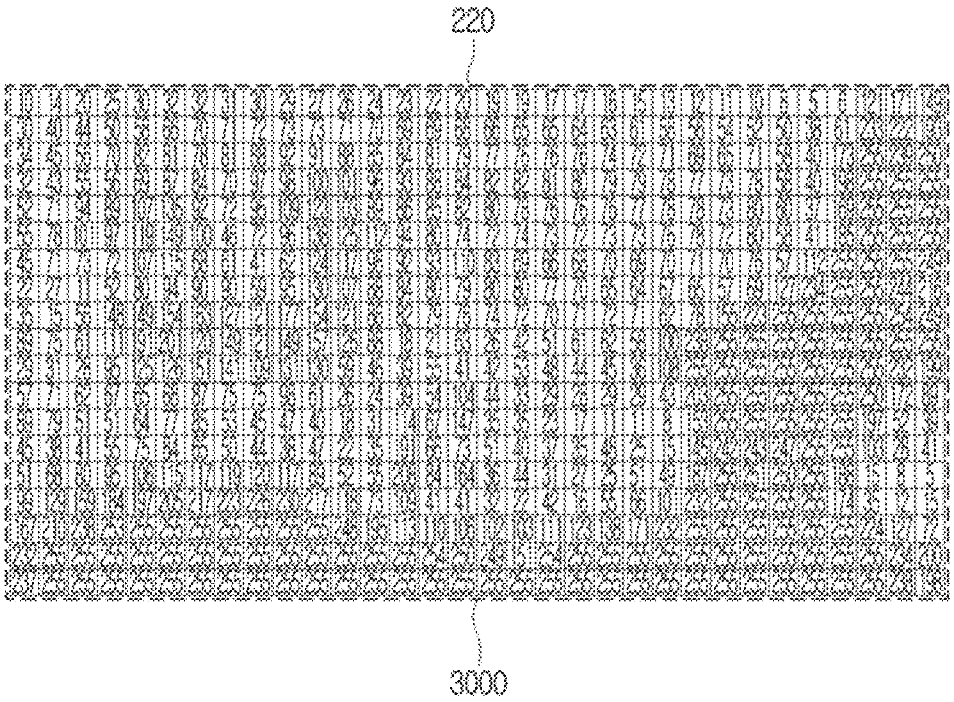
FIG. 8B is a diagram illustrating an embodiment of changing a parameter setting of a sensor based on reliability of all pixels constituting a sensor according to an embodiment of the disclosure.

The processor 120 may change the parameter setting of the sensor 110 based on the reliability of the entire cell corresponding to the entire pixel constituting the light receiver 20. In this case, the ROI may be an area 3000 including all cells of the second information 220, as shown in FIG. 8B.

Specifically, the processor 120 may determine the number of cells having a reliability value less than or equal to a predetermined threshold value among a plurality of cells included in the ROI 3000 based on the second information. Here, the predetermined threshold value may be a minimum reliability value required for distance measurement, for example, 50, but is not limited thereto. The processor 120 may change the parameter setting of the sensor 110 when the number of cells having the reliability value below or equal to a predetermined threshold value among the plurality of cells included in the ROI 3000 is greater than or equal to a predetermined number (e.g., 50).

According to an embodiment, the distance information of the ROI including at least one cell having an output value of 0 is changed based on the distance information obtained by the sensor 110 in which the parameter setting is changed. However, this is merely exemplary, and the electronic apparatus 100 may output a value which is not 0, and the distance information of the ROI including at least one cell whose reliability value is less than or equal to a threshold value may be changed based on the distance information obtained by the sensor 110 in which the parameter setting is changed.

Figure 9A:
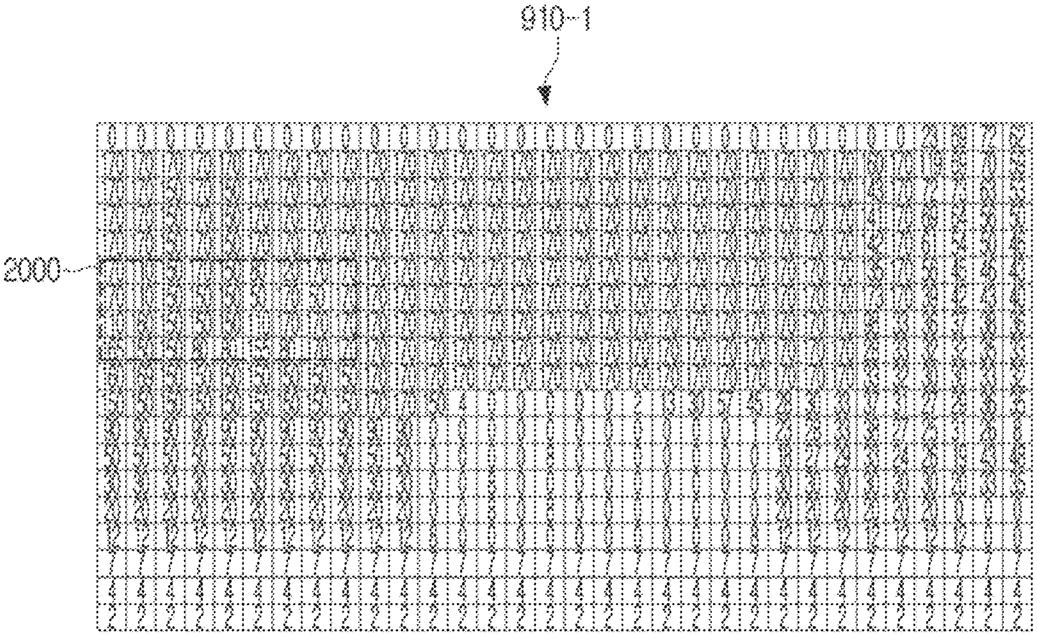
FIG. 9A is a diagram illustrating first information including distance information according to an embodiment of the disclosure.
Figure 9B:
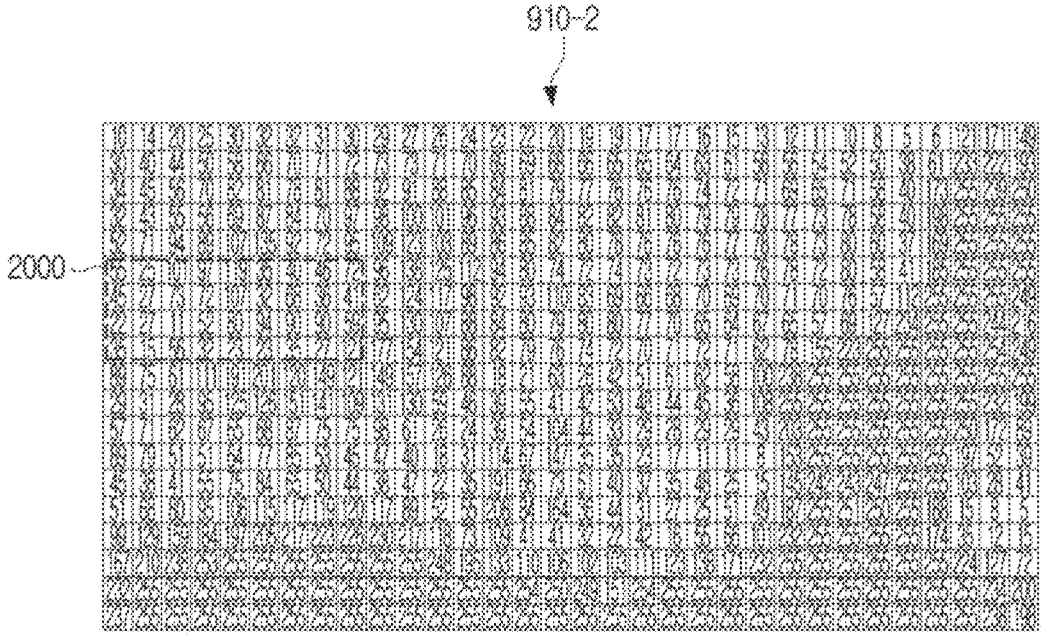
FIG. 9B is a diagram illustrating second information including reliability information according to an embodiment of the disclosure.
Figure 9C:
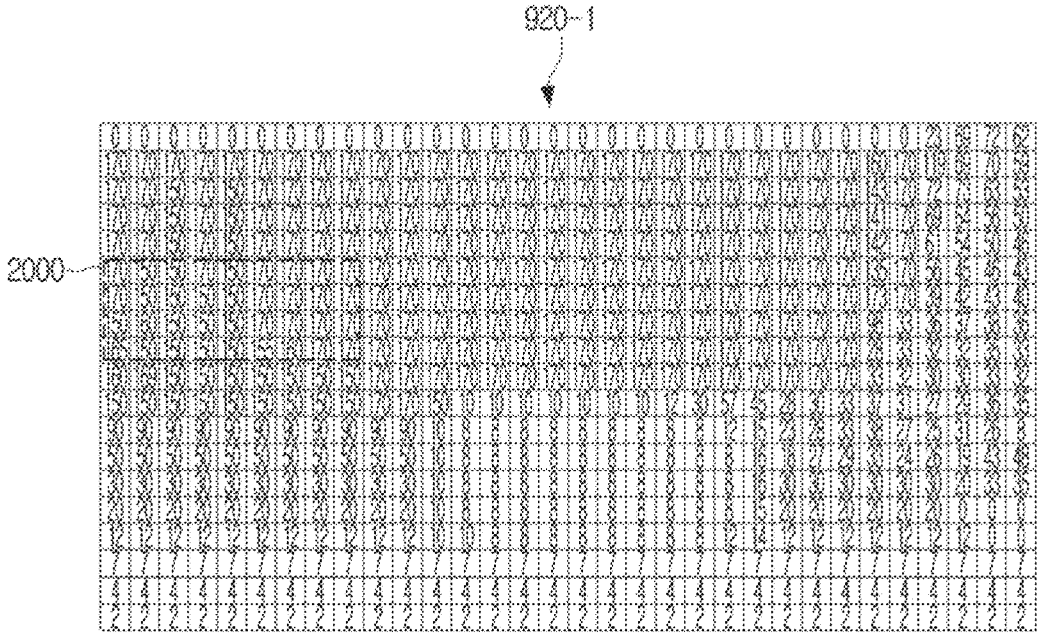
FIG. 9C is a diagram illustrating third information including distance information according to an embodiment of the disclosure.
Figure 9D:
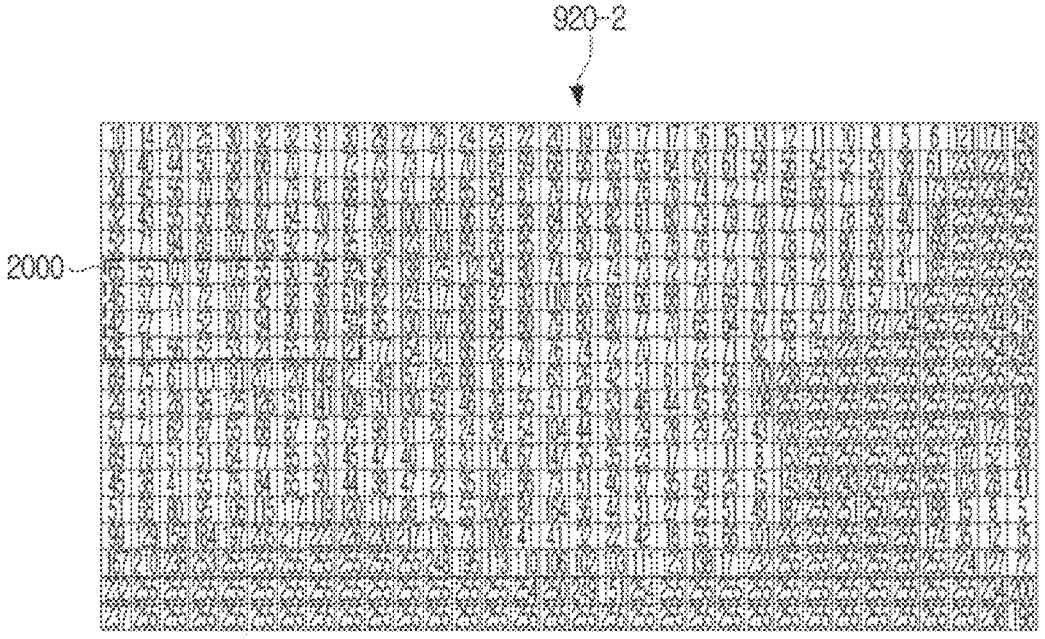
FIG. 9D is a diagram illustrating fourth information including reliability information according to an embodiment of the disclosure.

For example, first information 910-1 including the distance information corresponding to the plurality of cells as shown in FIG. 9A and the second information 910-2 including reliability information corresponding to the plurality of cells as shown in FIG. 9B are obtained by the sensor 110.

Referring to FIGS. 9A and 9B, the processor 120 may identify at least one cell having a reliability value less than or equal to a predetermined threshold value (e.g., 40), based on the distance information corresponding to the plurality of cells included in the first information 910-1 and reliability information corresponding to the plurality of cells included in the second information 910-2. The processor 120 may set the ROI 2000 including the identified at least one cell to the first information 910-1 and the second information 910-2. For example, as shown in FIGS. 9A and 9B, the ROI 2000 may be a rectangular region having a minimum size including at least one identified cell, but embodiment are not limited thereto, and the ROI may be various shapes such as polygonal shapes.

As described above, the processor 120 may change the parameter setting of the sensor 110 as the at least one cell having the output value of 0 is included in the first information 910-1, and may further obtain the third information 920-1 including the distance information from the sensor 110 in which the parameter setting is changed, and the fourth information 920-2 including the reliability information.

The processor 120 may change (or correct, update) the output value of the plurality of cells included in the ROI 2000 of the first information 910-1 based on an output value of a plurality of cells included in the ROI 2000 of the third information 920-1.

Specifically, the processor 120 may apply a first weight to the output value of the cell contained in the ROI 2000 of the first information 910-1, and a second weight may be applied to the output value of the cell contained in the ROI 2000 of the third information 920-1. The first weight may be the value obtained by dividing the reliability value of the cell contained in the ROI 2000 of the second information 910-2 by the summed value of the reliability value of the cell contained in the second information 910-2 and the reliability value of the cell contained in the fourth information 920-2, and the second weight may be the value obtained by dividing the reliability value of the cell contained in the ROI 2000 of the fourth information 920-2 by the summed value of the reliability value of the cell contained in the second information 910-2 and the reliability value of the cell contained in the fourth information 920-2. If the reliability value of the same cell is C1 in the second information 910-2, and C2 in the fourth information 920-2, the first weight may be $C1/(C1+C2)$, and the second weight may be $C2/(C1+C2)$.

The processor 120 may change an output value of a cell included in the ROI 2000 of the first information 910-1 to a sum value of a value to which a first weight is applied to an output value of a cell included in the ROI 2000 of the first information 910-1 and a value to which a second weight is applied to an output value of a cell included in the ROI 2000 of the third information 920-1.

As an example, if the reliability value of the first cell contained in the ROI 2000 of the second information 910-2 is 25, and the reliability value of the first cell contained in the ROI 2000 of the fourth information 920-2 is 55, the first weight may be 25/80, and the second weight may be 55/80. If the output value of the first cell contained in ROI 2000 of the first information 910-1 is 110, and the output value of the first cell contained in ROI 2000 of the third information 920-1 is 150, the processor 120 may change the output value 110 of the first cell to 127 (for convenience, the decimal point or less is rounded up) obtained through the operation of 110*(25/80)+150*(55/80). Similarly, the processor 120 may change an output value of the second through $n^{th}$ cells included in the ROI 2000 of the first information 910-1 based on a plurality of reliability values of a plurality of cells included in the ROI 2000 of the second information 910-2 and a plurality of reliability values of the plurality of cells included in the ROI 2000 of the fourth information 920-2.

Figure 9E:
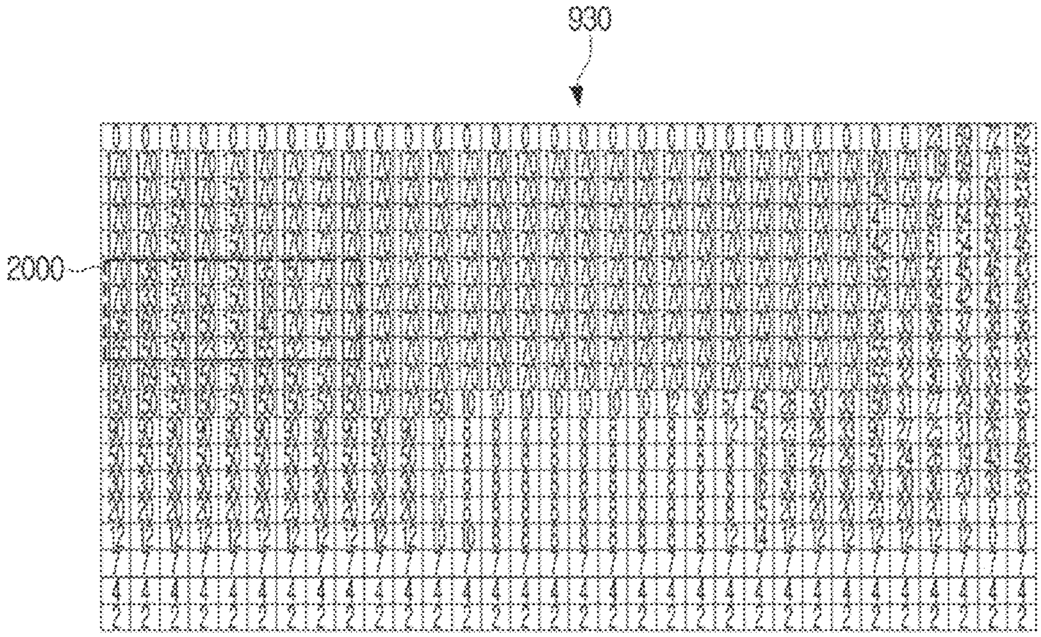
FIG. 9E is a diagram illustrating fifth information according to an embodiment of the disclosure.

As shown in FIG. 9E, the electronic apparatus 100 of may obtain the changed fifth information 930 based on the distance information obtained by the sensor 110 in which the parameter setting is changed. Accordingly, the disclosure may provide distance information with high quality over the entire cell.

The first weight according to the embodiment may be determined based on the standard deviation of a plurality of output values contained in the ROI 2000 of the first information 910-1, and the second weight may be determined based on the standard deviation of a plurality of output values contained in the ROI 2000 of the third information 920-1. If the output average value of the N cells contained in the ROI 2000 of the first information 910-1 is m1, and the output value of a plurality of cells contained in the ROI 2000 of the first information 910-1 is the x1 value to xn value, the standard deviation a1 of a plurality of output values contained in the ROI 2000 of the first information 910-1 may be obtained through the operation of root ((x1−m1)^2+(x2−m1)^2+ . . . +(xn−m1)^2)/N). If the average output value of the N cells contained in the ROI 2000 of the third information 920-1 is m2, and the output value of a plurality of cells contained in the ROI 2000 of the third information 920-1 is the y1 value to the yn value, the standard deviation a2 of a plurality of output values included in the ROI 2000 of the third information 920-1 may be obtained through the operation root((y1−m2)^2+(y2−m2)^2+ . . . +(yn−m2)^2)/N). The processor 120 may be weighted higher with a smaller standard deviation. Specifically, the electronic apparatus 100 may store information about a plurality of weights corresponding to a plurality of standard deviations (hereinafter, referred to as standard deviation-weight information), in which a higher weight is matched as the standard deviation is smaller. The processor 120 may determine a weight value corresponding to a standard deviation obtained through the operation described above among a plurality of pre-stored weights. For example, the processor 120 may determine a first weight corresponding to the standard deviation a1 and a second weight corresponding to the standard deviation a2 based on pre-stored standard deviation-weight information, wherein the first weight may be less than the second weight if the standard deviation a1 is greater than the standard deviation a2.

The processor 120 may change an output value of a first cell included in the ROI 2000 of the first information 910-1 to a sum value of a value to which a first weight is applied to a first cell included in the ROI 2000 of the first information 910-1 and a value to which a second weight is applied to an output value of the first cell included in the ROI 2000 of the third information 920-1. For example, if the output value of the first cell included in the ROI 2000 of the first information 910-1 is 110, the output value of the first cell included in the ROI 2000 of the third information 920-1 is 150, the first weight is 0.4, and the second weight is 0.6, the processor 120 may change the output value 110 of the first cell included in the ROI 2000 of the first information 910-1 to 134 obtained through the 110*0.4+150*0.6 operation. Similarly, the processor 120 may change the output values of the second through $n^{th}$ cells included in the ROI 2000 of the first information 910-1 based on the first and second weights.

As such, by outputting a value which is not 0, or changing the distance information of the ROI containing at least one cell with a reliability value below or equal to the threshold based on the distance information obtained by the sensor 110, the disclosure may obtain distance information having a high quality over the entire cell.

Figure 10A:
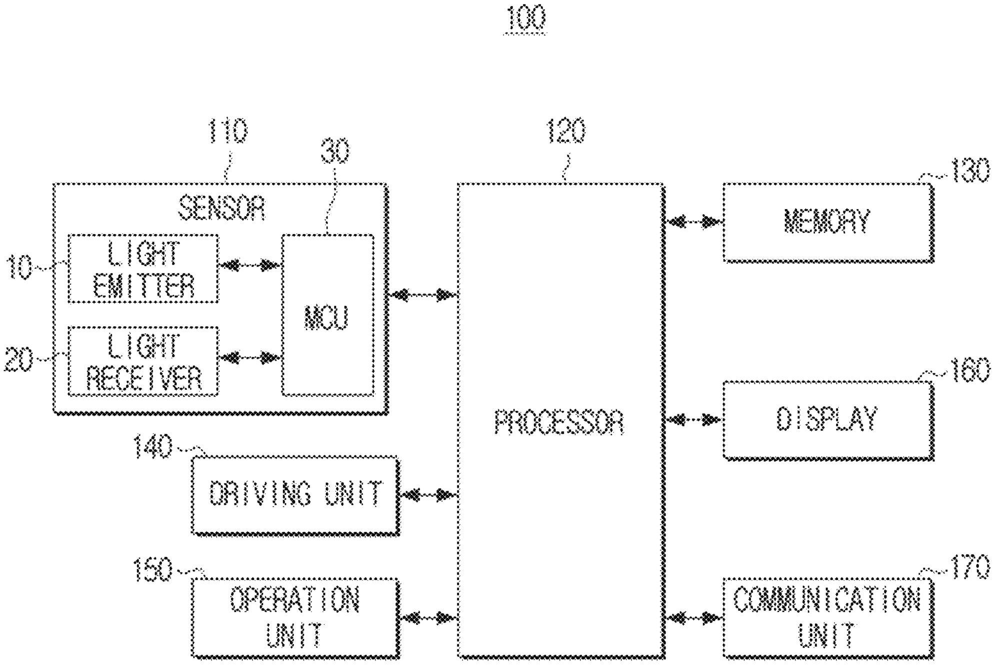
FIG. 10A is a detailed block diagram illustrating an electronic apparatus according to an embodiment of the disclosure.

FIG. 10A is a detailed block diagram illustrating an electronic apparatus according to an embodiment of the disclosure.

Referring to FIG. 10A, the electronic apparatus 100 according to an embodiment may include a sensor 110, a memory 130, a driving unit 140, an operation unit 150, a display 160, a communication unit 170 and the processor 120.

This is an embodiment, and the electronic apparatus 100 may be implemented except for the configuration of some of the above-described plurality of configurations, and may be implemented by further including additional configurations other than the above-described plurality of configurations. The parts overlapped with the above description will be omitted or shortened.

The memory 130 may store operating systems (OS) for controlling the overall operation of the components of the electronic apparatus 100 and instructions or data associated with the components of the electronic apparatus 100.

The processor 120 may control multiple hardware or software components of the electronic apparatus 100 using various instructions or data stored in the memory 130, load instructions or data received from at least one of the other components into a volatile memory, and store the various data in a non-volatile memory.

The memory 130 may store reliability-parameter setting information. The reliability-parameter setting information may include information about a plurality of parameter values corresponding to a plurality of reliability distributions. For example, the reliability-parameter setting information may store information about the parameter value for increasing the luminous intensity of the light emitter 10 by a1 times and/or the parameter value to increase the exposure time to the light by b1 times, if the ROI contains more than one plurality of pixels having a reliability value lower than the minimum threshold for measuring distance. Alternatively, if a number of pixels having a reliability value lower than the minimum threshold value for distance measurement included in the ROI is greater than the second predetermined number and less than the first predetermined number, the reliability-parameter setting information may store information on a parameter value for increasing the luminous intensity of the light emitter 20 by a2 times, and/or a parameter value for increasing the exposure time for the light by b2 times.

The memory 130 may store information on a plurality of parameter values corresponding to a plurality of operation values. The operation value may be a value calculated based on a reliability value of the plurality of pixels and a weight of the plurality of pixels.

The driving unit 140 may move the electronic apparatus 100. The driving unit 140 includes a driving unit and a motor connected to the driving unit. A driving unit of the driving unit 140 may be implemented as a wheel or a leg of a robot, and a motor of the driving unit 140 may move the electronic apparatus 1000 by controlling a driving unit according to the control of the processor 120.

For example, when the driving unit is implemented as a left wheel and a right wheel, the processor 120 may transmit a control signal for generating a first rotational force to the motor rotating the left wheel in order to move the electronic apparatus 100 in a direction that does not collide with a front object, and transmit a control signal for generating a second rotational force different from the first rotational force to a motor for rotating the right wheel, thereby changing the driving direction of the electronic apparatus 100.

The operation unit 150 may include a first motor, a robot arm connected to the first motor, a second motor, and a robot hand connected to the second motor. A robot arm and a robot hand may be connected through a connector, and a robot arm may perform three-dimensional movement or rotation according to the driving of a first motor connected to a robot arm. The robot hand may perform a three-dimensional movement, a rotation, or a product grip according to the driving of a second motor connected to a robot hand.

The display 160 may display a variety of screens. For example, the display 160 may display information about the distance to objects or objects around the electronic apparatus 100. The display 160 may display a depth map based on the first information or a reliability map based on the second information.

The display 160 may be implemented as a display of a liquid crystal display (LCD) panel. According to an embodiment, the display 160 may be implemented as various types of displays such as a light emitting diode (LED), Organic Light Emitting Diodes (OLED), Liquid Crystal on Silicon (LCoS), Digital Light Processing (DLP), or the like. In the display 160, a backlight unit, a driving circuit which may be implemented as a format such as an a-si thin-film transistor (TFT), low temperature poly silicon (LTPS) TFT, organic TFT (OTFT), or the like, may be included as well.

The display 160 may be combined with a touch sensor and implemented as a touch screen.

The communicator 170 is configured to communicate with an external device. For example, the communicator 170 may communicate with various external devices through a wireless communication method such as Bluetooth (BT), Bluetooth low energy (BLE), wireless fidelity (Wi-Fi), Zigbee, or the like, or an infrared (IR) communication method. The communicator 170 may be mounted on the processor 120, and may be included in the electronic apparatus 100 as a configuration separate from the processor 120.

The electronic apparatus 100 according to an embodiment may include various configurations, in addition to the above configurations.

For example, the electronic apparatus 100 may further include an input unit capable of receiving a user input. The input unit may be implemented as a button or a touch screen, and may receive various user commands such as a user command for sensing a distance to the object or a user command for moving the electronic apparatus 100.

The electronic apparatus 100 may further include a speaker capable of outputting various audio data.

The electronic apparatus 100 may further include a microphone capable of receiving a user voice. The user voice may be a user voice for executing a task of the electronic apparatus 100.

Figure 10B:
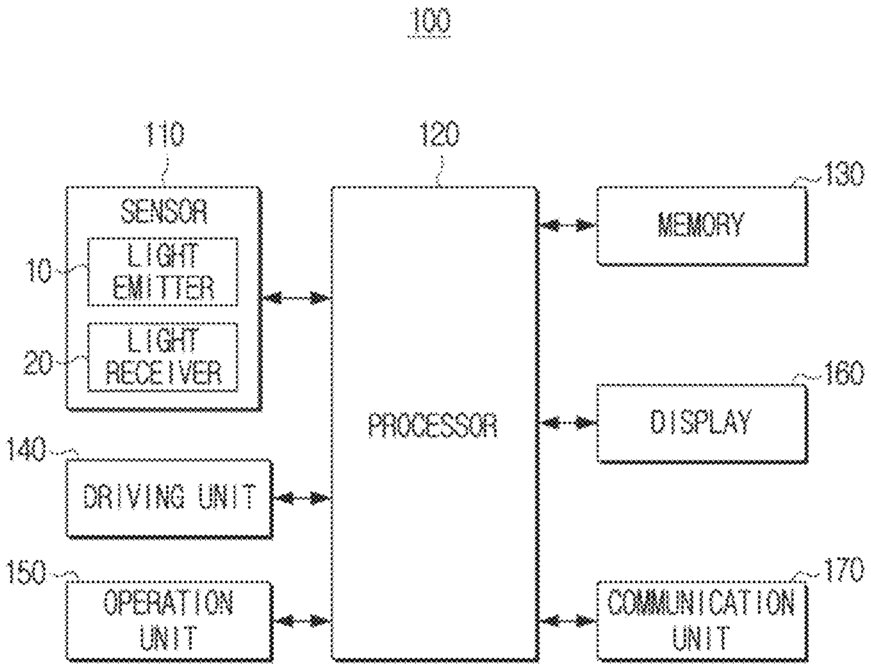
FIG. 10B is a detailed block diagram illustrating an electronic apparatus according to an embodiment of the disclosure.

The sensor 110 includes the light emitter 10 and the light receiver 20 as shown in FIG. 10B, and the function of the MCU 30 may be performed by the processor 120, as shown in FIG. 10B. In this example, the light emitter 10 may radiate light on the basis of the control signal received from the processor 120, and the processor 120 may determine the distance between the sensor 110 and the object based on the time until the light radiated by the light emitter 10 is reflected by the object and received by the light receiver 20.

Figure 11:
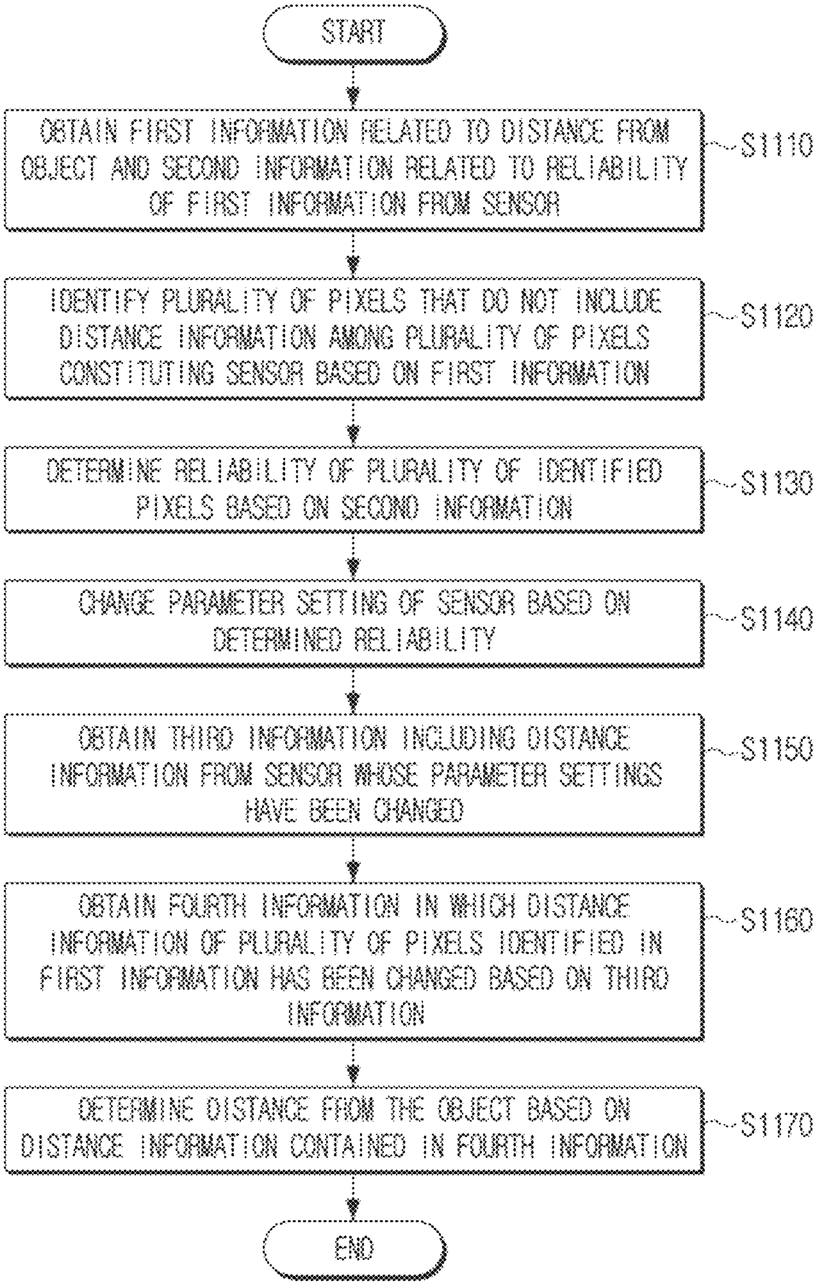
FIG. 11 is a flowchart illustrating a method of controlling an electronic apparatus according to an embodiment of the disclosure.

FIG. 11 is a flowchart illustrating a method of controlling an electronic apparatus according to an embodiment of the disclosure.

The electronic apparatus 100 may obtain first information related to the distance to the object and second information related to the reliability of the first information from the sensor in operation S1110.

The first information may include information about the distance to the object. Specifically, the first information may include information on a plurality of distances corresponding to a plurality of pixels included in the sensor. The second information may include information on the reliability of each of the plurality of pixels constituting the first information.

The electronic apparatus 100 may identify at least one pixel that does not include distance information among the plurality of pixels constituting the sensor based on the first information in operation S1120.

When the first information including the distance information is received from the sensor, the electronic apparatus 100 may identify at least one pixel having an output value of 0 indicating no distance information among the plurality of pixels constituting the sensor based on the distance information. The at least one identified pixel may be a pixel in which light having an amount of light less than or equal to a minimum threshold value required for distance measurement may be received.

The electronic apparatus 100 may determine the reliability of a plurality of identified pixels based on the second information in operation S1130.

The electronic apparatus 100 may set an ROI including the identified at least one pixel. The ROI may be a square-shaped region of a minimum size including the at least one pixel having an output value of 0.

The electronic apparatus 100 may determine the reliability of a plurality of pixels contained in the ROI based on the second information.

The electronic apparatus 100 may change one or more parameter settings of the sensor based on the determined reliability in operation S1140.

The parameters of the sensor may be, for example, parameters for adjusting the luminance of the light emitter or parameters for adjusting the exposure time to light.

The electronic apparatus 100 may change the parameter settings of the sensor based on the reliability distribution (or histogram) of the plurality of pixels constituting the ROI. For this purpose, the electronic apparatus 100 may determine the reliability of each of the plurality of pixels contained in the ROI. The electronic apparatus 100 may determine the number of pixels belonging to the reliability range by the range of the reliability. The electronic apparatus 100 may change the parameter settings of the sensor based on the reliability distribution and reliability-parameter setting information of the plurality of pixels constituting the ROI.

The electronic apparatus 100 may obtain third information including distance information from the sensor whose parameter settings have been changed in operation S1150. The third information may include information about the distance to the object detected by the sensor that increases the luminosity of the light emitter or increases the exposure time to the light.

The electronic apparatus 100 may obtain the fourth information in which the distance information of the plurality of pixels identified in the first information has been changed based on the third information in operation S1160. The electronic apparatus 100 may obtain the changed fourth information based on the output value in which the output value included in the ROI of the first information is included in the ROI of the third information.

The electronic apparatus 100 may determine the distance to the object based on the distance information contained in the fourth information in operation S1170. The electronic apparatus 100 may perform processes such as driving, stopping, and controlling the direction of driving of the electronic apparatus 100 based on the distance information contained in the fourth information.

Accordingly, in the electronic apparatus 100 of the disclosure that performs a process such as driving based on the fourth information, it is possible to prevent problems (e.g., collision with objects of black color, etc.) caused by the related-art electronic apparatus not detecting the distance to an object of dark color such as black color.

Figure 12:
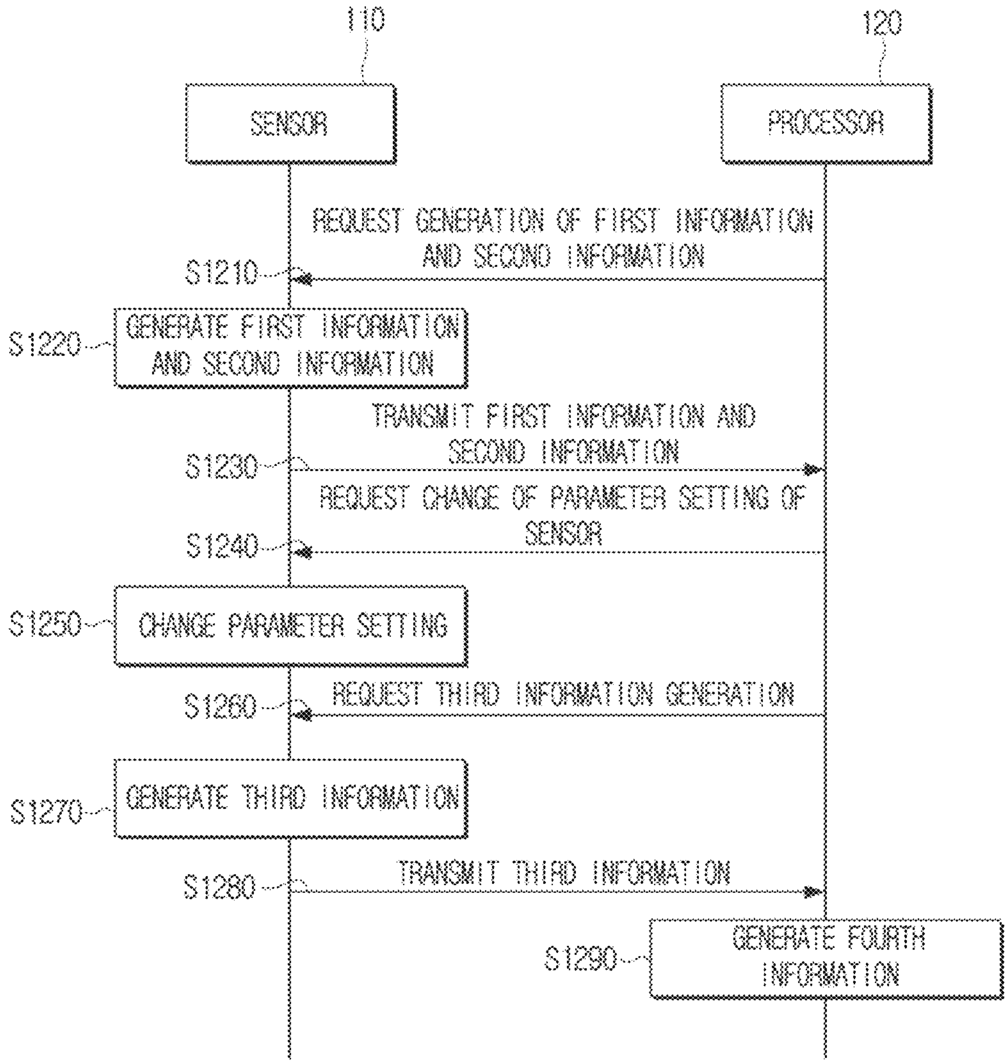
FIG. 12 is a flowchart illustrating a method for controlling an electronic apparatus according to an embodiment of the disclosure.

FIG. 12 is a flowchart illustrating a method for controlling an electronic apparatus according to an embodiment of the disclosure.

The processor 120 may transmit a signal requesting the generation (or transmission) of first information related to the distance to the object and second information related to the reliability of the first information to the sensor 110 in operation S1210. For example, the processor 120 may transmit a signal requesting the generation of first and second information to the sensor 110 when a user command for the movement of the electronic apparatus 100 is entered or a user command for detecting the distance to the object is entered.

The sensor 110 may generate the first information and the second information according to the control of the processor 120 in operation S1220.

The MCU 30 of the sensor 110 may control the light emitter 10 to radiate light based on a signal received from the processor 120. The MCU 30 may determine a distance between the sensor 110 and the object based on a time until the light reflected by the light emitter 10 is received by the light receiver 20, and generate the first information including information on a distance to an object by a plurality of cells corresponding to the plurality of pixels. The MCU 30 of the sensor 110 may determine the reliability of the distance information measured for each pixel constituting the light receiver 20 based on a plurality of charges measured as a plurality of lights on the different phase shifts is received in the receiver 20, and may generate second information containing a reliability value for each cell corresponding to each pixel.

The sensor 110 may transmit the first information and the second information to the processor 120 in operation S1230, and the processor 120 may identify at least one cell that does not contain distance information among a plurality of cells based on the first information.

When the processor 120 receives the first information from the sensor 110, the processor 120 may identify at least one cell having an output value of 0 indicating no distance information among the plurality of cells based on the distance information of each cell included in the first information. Here, the at least one identified cell may be a cell corresponding to a pixel receiving light having an amount of light less than or equal to a minimum threshold value required for distance measurement.

The processor 120 may determine the reliability of the plurality of cells identified based on the second information.

The processor 120 may set a ROI including at least a cell identified based on the first information. The ROI may be an area of the minimum size square containing at least one cell with an output value of 0, as an example.

The processor 120 may determine the reliability of the plurality of cells included in the ROI based on the second information.

Thereafter, the processor 120 may transmit a signal requesting a change in the parameter settings of the sensor to the sensor 110 based on the determined reliability in operation S1240.

The parameters of the sensor may be, for example, parameters for adjusting the luminosity of the luminescent part or parameters for adjusting the exposure time to light.

The processor 120 may transmit a signal requesting a change in the parameter settings of the sensor to the sensor 110 based on the reliability distribution (or histogram) of the plurality of cells constituting the ROI. For this purpose, the processor 120 may determine the reliability of each of the plurality of cells included in the ROI based on the second information. The processor 120 may determine a number of cells belonging to each reliability range in the ROI by ranges of the reliability, and transmit a signal requesting changing parameter setting of a sensor based on reliability distribution of a plurality of cells constituting ROI and reliability-parameter setting information.

The sensor 110 may change the parameter settings based on the signal received from the processor 120 in operation S1250, and may transmit the signal to the processor 120 for the completion of the parameter setting change.

If it is determined that the parameter setting of the sensor 110 has been changed, the processor 120 may transmit the signal requesting the generation of third information to the sensor 110 in operation S1260.

The sensor 110 may generate third information including information about the distance to the object based on the signal received from the processor 120 in operation S1270, and may transmit the third information to the processor 120 in operation S1280. The third information may include information about the distance to the object detected by the sensor 100, which increases the luminosity of the light emitter or increases the exposure time to the light.

The processor 120 may generate fourth information in which the distance information of the plurality of cells identified in the first information has changed based on the third information in operation S1290. The processor 120 may obtain fourth information in which the output value contained in the ROI of the first information is changed based on the output value contained in the ROI of the third information.

The processor 120 may obtain distance information from the object based on the distance information contained in the fourth information, and based thereon, the processor 120 may perform processes such as driving, stopping, and controlling the direction of driving of the electronic apparatus 100.

In that the electronic apparatus 100 of this disclosure performs a process such as driving based on the fourth information, it is possible to prevent problems (e.g., collision with objects of black color, etc.) caused by the related-art electronic apparatus not detecting the distance to an object of dark color such as black color.

The methods according to various embodiments may be implemented in the form of software or an application installable in the electronic apparatus.

The methods according to various embodiments may be implemented by software upgrade of a related art electronic apparatus, or hardware upgrade only.

The various embodiments described above may be implemented through an embedded server provided in the electronic apparatus or a server outside the electronic apparatus.

A non-transitory computer readable medium which stores a program for sequentially executing a method for controlling an electronic apparatus according to an embodiment may be provided.

The non-transitory computer readable medium refers to a medium that is readable by an apparatus. To be specific, the aforementioned various applications or programs may be stored in the non-transitory computer readable medium, for example, a compact disc (CD), a digital versatile disc (DVD), a hard disk, a Blu-ray disc, a universal serial bus (USB), a memory card, a read only memory (ROM), and the like, and may be provided.

While the disclosure has been shown and described with reference to various embodiments thereof, it will be understood by those of ordinary skill in the art that various changes in form and details may be made therein without departing from the spirit and scope of the disclosure as defined by the appended claims and their equivalents.

What is claimed is:

1. An electronic apparatus comprising:

a sensor comprising a light receiver and configured to output first information related to a distance to an object and second information related to a reliability of the first information; and a processor, wherein the sensor is further configured to:

based on an amount of light reflected from the object and received by each pixel of a plurality of pixels of the light receiver being less than or equal to a threshold value, output a distance value being 0, based on the amount of the light reflected from the object and received by each pixel of the plurality of pixels being greater than the threshold value, output a distance value between a corresponding pixel of the plurality of pixels and the object, wherein the first information includes distance values in a plurality of cells corresponding to the plurality of pixels, and the distance values include first distance values in first cells among the plurality of cells and second distance values in second cells among the plurality of cells, each of the first distance values being 0, obtain reliability values of the distance values in the plurality of cells, wherein the second information includes the reliability values of the distance values in the plurality of cells, the reliability values of the distance values include a reliability value for 0 of each of the first distance values in the first cells and a reliability value for a distance value of each of the second distance values in the second cells, output the first information including the distance values in the plurality of cells and the second information including the reliability values of the distance values in the plurality of cells, and wherein the processor is configured to:

obtain, from the sensor, the first information including the distance values in the plurality of cells and the second information including the reliability values of the distance values in the plurality of cells, identify each of the first cells including 0, among the plurality of cells corresponding to the plurality of pixels, based on the first information, determine a reliability of each of the first distance values in the first cells and the second distance values in the second cells based on the second information, change a parameter setting of the sensor based on the determined reliability, obtain, from the sensor of which the parameter setting is changed, third information related to the distance to the object, obtain fourth information including distance information of the plurality of cells based on the first information and the third information, and obtain the distance to the object based on the distance information included in the fourth information.

2. The electronic apparatus of claim 1, wherein the processor is further configured to:

set a region of interest (ROI) including the first cells, and change the parameter setting of the sensor based on a reliability of cells included in the ROI.

3. The electronic apparatus of claim 2, wherein the processor is further configured to:

determine a number of cells belonging to each reliability range in the ROI among ranges of the reliability of the cells, obtain parameter setting information corresponding to a reliability distribution of the cells included in the ROI based on reliability-parameter setting information, and change the parameter setting of the sensor based on the parameter setting information.

4. The electronic apparatus of claim 2, wherein the processor is further configured to, based on the reliability of the cells included in the ROI, change at least one of a parameter value for adjusting luminous intensity of the sensor or a parameter value for adjusting an exposure time to light.

5. The electronic apparatus of claim 2, wherein a reliability of the third information is higher than the reliability of the first information.

6. The electronic apparatus of claim 1, wherein the processor is further configured to:

determine, in the third information, a plurality of cells included in a region of interest (ROI) set based on the first information, obtain distance information of the plurality of cells included in the ROI, and obtain the fourth information based on the first information and the distance information of the plurality of cells included in the ROI.

7. The electronic apparatus of claim 1, wherein the processor is further configured to:

identify a plurality of cells included in a preset region of interest (ROI) among the plurality of cells corresponding to the plurality of pixels constituting the sensor, determine a reliability of the plurality of cells included in the ROI based on the second information, and change the parameter setting of the sensor based on the determined reliability of the plurality of cells included in the ROI.

8. The electronic apparatus of claim 1, wherein the processor is further configured to:

identify, based on the second information, a number of cells having a reliability value less than or equal to a preset threshold value among the plurality of cells corresponding to the plurality of pixels constituting the sensor, based on the number of the cells having the reliability value less than or equal to the preset threshold value being greater than or equal to a preset number, change the parameter setting of the sensor, and obtain, from the sensor of which the parameter setting is changed, the third information including distance information.

9. The electronic apparatus of claim 1, wherein the processor is further configured to:

apply a weight to a reliability value of each of the first cells based on an identified position of each of the first cells, and change the parameter setting of the sensor based on the reliability value of each of the first cells to which the weight is applied.

10. The electronic apparatus of claim 1, wherein the processor is further configured to:

based on the first information, identify at least one cell of which a reliability is less than or equal to a threshold value among the plurality of cells, and obtain the fourth information of which the distance information of each of the first cells exceeds the threshold value based on the first information and the third information.

11. A control method of an electronic apparatus, the control method comprising:

outputting, by a sensor of the electronic apparatus, first information related to a distance to an object and second information related to a reliability of the first information, wherein the outputting the first information and the second information comprises:

based on an amount of light reflected from the object and received by each pixel of a plurality of pixels of a light receiver of the sensor being less than or equal to a threshold value, outputting a distance value being 0, based on the amount of the light reflected from the object and received by each pixel of the plurality of pixels being greater than the threshold value, outputting a distance value between a corresponding pixel of the plurality of pixels and the object, wherein the first information includes distance values in a plurality of cells corresponding to the plurality of pixels, and the distance values include first distance values in first cells among the plurality of cells and second distance values in second cells among the plurality of cells, each of the first distance values being 0, obtaining reliability values of the distance values in the plurality of cells, wherein the second information includes the reliability values of the distance values in the plurality of cells, the reliability values of the distance values include a reliability value for 0 of each of the first distance values in the first cells and a reliability value for a distance value of each of the second distance values in the second cells, and outputting the first information including the distance values in the plurality of cells and the second information including the reliability values of the distance values in the plurality of cells;

obtaining, from the sensor of the electronic apparatus, the first information including the distance values in the plurality of cells and the second information including the reliability values of the distance values in the plurality of cells;

identifying each of the first cells including 0, among the plurality of cells corresponding to the plurality of pixels, based on the first information;

determining a reliability of each of the first distance values in the first cells and the second distance values in the second cells based on the second information;

changing a parameter setting of the sensor based on the determined reliability;

obtaining, from the sensor of which the parameter setting is changed, third information related to the distance to the object;

obtaining fourth information including distance information of the plurality of cells based on the first information and the third information; and obtaining the distance to the object based on the distance information included in the fourth information.

12. The method of claim 11, wherein the changing the parameter setting comprises setting a region of interest (ROI) including the first cells, and changing the parameter setting of the sensor based on a reliability of cells included in the ROI.

13. The method of claim 12, wherein the changing the parameter setting comprises determining a number of cells belonging to each reliability range in the ROI among ranges of the reliability of the cells, obtaining parameter setting information corresponding to a reliability distribution of the cells included in the ROI based on reliability-parameter setting information, and changing the parameter setting of the sensor based on the parameter setting information.

14. The method of claim 12, wherein the changing the parameter setting comprises, based on the reliability of the cells included in the ROI, changing at least one of a parameter value for adjusting luminous intensity of the sensor or a parameter value for adjusting an exposure time to light.

15. The method of claim 11, wherein a reliability of the third information is higher than the reliability of the first information.

16. The method of claim 11, wherein the obtaining the fourth information comprises, determining a plurality of cells included in a region of interest (ROI) set based on the first information, in the third information, obtaining distance information of the plurality of cells included in the ROI, and obtaining the fourth information based on the first information and the obtained distance information.

17. The method of claim 11, wherein the changing the parameter setting comprises, identifying a plurality of cells included in a preset region of interest (ROI) among a plurality of cells corresponding to the plurality of pixels constituting the sensor, determining a reliability of the plurality of cells included in the ROI based on the second information, and changing parameter setting of the sensor based on the determined reliability.

18. The method of claim 11, wherein the obtaining the third information comprises, determining a number of cells having a reliability value less than or equal to a preset threshold value among the plurality of cells corresponding to the plurality of pixels constituting the sensor based on the second information, based on the number of cells having the reliability value less than or equal to the preset threshold value being greater than or equal to a preset number, changing the parameter setting of the sensor, and obtaining the third information including distance information from the sensor of which the parameter setting is changed.

19. The method of claim 11, wherein the changing the parameter setting comprises, applying a weight to a reliability value of each of the first cells based on an identified position of each of the first cells, and changing parameter setting of the sensor based on the reliability value of each of the first cells to which the weight is applied.

20. The method of claim 11, wherein the obtaining the fourth information comprises, based on the first information, identifying at least one cell of which a reliability is less than or equal to a threshold value among the plurality of cells, and obtaining the fourth information of which the distance information of each of the first cells exceeds the threshold value based on the first information and the third information.

* * * * *